(12) United States Patent
Nakai et al.

(10) Patent No.: US 7,910,028 B2
(45) Date of Patent: Mar. 22, 2011

(54) RESIN COMPOSITION FOR DIRECT VAPOR DEPOSITION, MOLDED ARTICLES MADE BY USING THE SAME, AND SURFACE-METALLIZED LAMP HOUSING

(75) Inventors: Yoshihiro Nakai, Yamaguchi (JP); Takahiro Ikebe, Yamaguchi (JP); Keiji Obata, Yamaguchi (JP); Hideyuki Shigemitsu, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 12/716,646

(22) Filed: Mar. 3, 2010

(65) Prior Publication Data

US 2010/0159134 A1   Jun. 24, 2010

Related U.S. Application Data

(63) Continuation of application No. 10/485,117, filed as application No. PCT/JP02/08044 on Aug. 7, 2002, now abandoned.

(30) Foreign Application Priority Data

Aug. 10, 2001   (JP) .................................. 2001-243941
Apr. 12, 2002   (JP) .................................. 2002-110530
Apr. 23, 2002   (JP) .................................. 2002-120893

(51) Int. Cl.
   *B29D 11/00*   (2006.01)
(52) U.S. Cl. .................. 264/1.9; 264/129; 264/331.13; 264/331.15; 427/455; 427/456
(58) Field of Classification Search .................. 264/1.9, 264/129, 331.13, 331.15; 427/455, 456
See application file for complete search history.

(56) References Cited

U.S. PATENT DOCUMENTS

| | | | |
|---|---|---|---|
| 4,894,415 A | 1/1990 | Sasaki et al. | |
| 5,043,405 A | 8/1991 | Koseki et al. | |
| 5,132,191 A | 7/1992 | Zarnoch | |
| 5,275,882 A | 1/1994 | Conley | |
| 5,391,648 A | 2/1995 | Yamamoto et al. | |
| 5,498,440 A | 3/1996 | Chao | |
| 5,543,460 A | 8/1996 | Yamamoto et al. | |
| 5,804,655 A | 9/1998 | Miyatake et al. | |
| 2004/0063814 A1 | 4/2004 | Miyatake et al. | |

FOREIGN PATENT DOCUMENTS

| | | |
|---|---|---|
| JP | 5-311021 | 11/1993 |
| JP | 6-145451 | 5/1994 |
| JP | 6-166803 | 6/1994 |
| JP | 11-199642 | 7/1999 |
| JP | 2001-2869 | 1/2001 |
| JP | 2001-200132 | 7/2001 |
| JP | 2001-253990 | 9/2001 |
| JP | 2001-302899 | 10/2001 |
| JP | 2002-20572 | 1/2002 |
| JP | 2002-133916 | 5/2002 |
| JP | 2002-161184 | 6/2002 |
| JP | 2002-234920 | 8/2002 |
| JP | 2003-26890 | 1/2003 |
| JP | 2003-55522 | 2/2003 |

OTHER PUBLICATIONS

Patent Abstracts of Japan, JP 2001-002869, Jan. 9, 2001.
Patent Abstracts of Japan, JP 56-072037, Jun. 16, 1981.
Roshin Ro, "Metalization of Plastics" $4^{TH}$ Edition, Nikkan Kogyo Shimbun Ltd., Jun. 15, 1967, pp. 55, 75, 201-202 and 209 (with partial English translation).

*Primary Examiner* — Margaret G Moore
(74) *Attorney, Agent, or Firm* — Oblon, Spivak, McClelland, Maier & Neustadt, L.L.P.

(57) ABSTRACT

The direct vapor depositing resin composition of the present invention comprises at least one selected from the group consisting of (A-I): a graft copolymer obtained by graft-polymerizing one or more monomers or a monomer mixture to a complex rubber-like polymer (G) composed of a polyorganosiloxane and a (meth)acrylate-based polymer and (A-II): a graft copolymer obtained by graft-polymerizing one or more monomers or a monomer mixture including an alkyl (meth)acrylate as an essential component to a rubber-like polymer (R) in which the content of diene units is 30% by weight or less in 100% by weight of the whole rubber-like polymer. The direct vapor depositing resin composition of the present invention can provide a beautiful bright appearance after direct vapor deposition of a metal, further, has high level mechanical strengths such as impact strength and the like, and weather resistance, and is also excellent in hot plate welding property with a transparent resin such as PMMA resins, PC resins and the like.

7 Claims, No Drawings

RESIN COMPOSITION FOR DIRECT VAPOR DEPOSITION, MOLDED ARTICLES MADE BY USING THE SAME, AND SURFACE-METALLIZED LAMP HOUSING

This application is a continuation of Ser. No. 10/485,117, filed Feb. 5, 2004 and now abandoned, which is a national state entry of JP 02/08044, filed Aug. 7, 2002.

TECHNICAL FIELD

The present invention relates to a so-called direct vapor-depositing resin composition capable of directly forming a layer made of a metal such as aluminum, chromium and the like by metallizing treatment such as a vacuum vapor depositing method, sputtering method and the like without imparting surface treatment and under coat, for obtaining a brightening-treated molded article, further, to a resin composition suitable for lamp housings and, a molded article and lamp housing the same.

BACKGROUND ART

Thermoplastic resin molded articles for automobile parts and various electric appliance housings are sometimes subjected to metallizing treatment such as formation of a metal layer of copper, chromium, nickel and the like on the surface of a molded article by plating surface treatment, and formation of a metal layer of aluminum, chromium and the like on the surface of a molded article by a vacuum vapor depositing method, sputtering method and the like, for enhancing design and other functions.

Conventionally, in performing surface metallizing treatment by a vacuum vapor depositing method, sputtering method and the like on such a resin molded article, it is necessary to form an undercoat-treated layer by painting and plasma polymerization treatment, then, to form a metal layer (thickness: decades to several hundred nm) by a vacuum vapor depositing method and the like, for deleting irregularity on the surface of a molded article to obtain smoothness. Usually, thereafter, a top coat layer made of a silicon-based material and the like is formed for the purpose of protecting the metal layer. Thus, the metallizing treatment of a thermoplastic resin molded article requires complicated many processes and special apparatuses and expensive treating agents. However, there is conducted, recently, a so-called "direct vapor depositing method" in which a pre-treatment process of forming an undercoat-treated layer is abbreviated.

However, the design of a bright molded article obtained by this "direct vapor depositing method" varies significantly depending on the kind of a resin material and the surface condition of a resin molded article. In the direct vapor depositing method, particularly, obtaining beautiful bright appearance without surface hazing is one of important subjects.

For such a field, for example, Japanese Patent Application Laid-Open (JP-A) No. 2001-2869 discloses a thermoplastic resin composition excellent in direct vapor depositing property comprising a rubber-containing graft copolymer obtained by graft-polymerizing a vinyl-based monomer (styrene, acrylonitrile) to a rubber-like polymer having specific particle size distribution (polyorganosiloxane-based polymers, acrylate polymers and the like), and a hard copolymer obtained by copolymerizing an aromatic vinyl-based monomer, a vinyl cyanide-based monomer and optionally other copolymerizable unsaturated monomers.

Also, JP-A No. 2002-133916 discloses, as a lamp housing material for automobile lamp equipments, a rubber-reinforced styrene-based resin composed of a graft polymer obtained by polymerizing an aromatic vinyl-based monomer (styrene, α-methylstyrene and the like) and a vinyl cyanide monomer (acrylonitrile and the like) in the presence of a rubber-like polymer having specific particle size distribution (polybutadiene-based rubber, ethylene-propylene-based rubber, acrylic rubber, silicone-based rubber and the like), or composed of a copolymer obtained by polymerizing the above-mentioned graft polymer and the above-mentioned monomer.

Automobile tail lamps, stop lamps, head lamps and the like are generally constituted of a lens made of a transparent resin such as PMMA (polymethyl methacrylate) resins, PC (polycarbonate) resins and the like, and a housing supporting the lens. Since such an automobile lamp housing is often exposed to sunlight outdoors, materials excellent in weather resistance are desired, in recent years.

Further, a so-called hot plate welding method is becoming general, in which in connecting a lens made of a transparent resin and a housing, a heated hot plate is pushed for several seconds to an adhesion part at which both materials are connected to heat-melt the both materials, and the hot plate is quickly removed, connecting the both materials. In the hot plate welding method, a phenomenon sometimes occurs in which each part of the both materials adheres to a hot plate of high temperature and stringiness occurs in removing the hot plate, therefore, it is important that this stringiness is scarce in using these materials.

As a material in such a field, for example, JP-A No. 10-310676 discloses, a hot plate welding thermoplastic resin composition composed of 10 to 100 parts by weight of a graft polymer obtained by graft-polymerizing at least one monomer unit selected from the group consisting of a vinyl cyanide monomer, an aromatic monomer, a (meth)acrylate monomer and other vinyl monomers in the presence of at least one rubber-like polymer selected from the group consisting of cross-linked acrylic rubbers and polyorganosiloxane-based rubbers, and 0 to 90 parts by weight of a copolymer composed of an aromatic vinyl-based monomer unit, a vinyl cyanide monomer unit and other vinyl-based monomer units.

JP-A No. 2000-336235 discloses, as a resin composition significantly improving stringiness in a hot plate welding method, an automobile lamp equipment lamp body resin prepared by compounding 3 to 30% by weight of a homopolymer of a methacrylate or a copolymer of monomer components containing a methacrylate as a main component in 97 to 70% by weight of a rubber-reinforced styrene-based resin.

Further, JP-A No. 2000-302824 discloses a thermoplastic resin composition containing a graft copolymer (A) having a rubber-like graft copolymer obtained by polymerizing 10 to 1000 parts by weight of (II) a monomer mixture composed of 50 to 100% by weight of a monomer unit composed of methyl methacrylate and/or styrene and 0 to 50% by weight of a monomer unit copolymerizable with the above-mentioned monomer unit, to 100 parts by weight of (I) a rubber-like copolymer obtained by polymerizing a monomer mixture containing an alkyl acrylate monomer unit and a 1,3-butadiene monomer unit, as a thermoplastic resin composition performing excellent welding with a PMMA resin, PC resin and the like by vibration welding, showing excellent appearance of melted portions occurring in vibration welding and manifesting a good vibration welding property, and a molded body made of this thermoplastic resin composition.

However, the resin compositions excellent in a direct vapor deposition property disclosed in JP-A Nos. 2001-2869 and 2002-133916 are not necessarily sufficient for responding a recent high requirement level for brightness. Furthermore, in applications such as an automobile lamp housing and the like, it is necessary that a molded article additionally has high weather resistance level. By further reducing the amount of the rubber component having large particle size specifically suggested in JP-A No. 2001-2869, brightness of higher level can be manifested, however, in this case, decrease in impact resistance and weather resistance is often remarkable, and it is difficult to simultaneously satisfy brightness by direct vapor deposition treatment, impact resistance and weather resistance. Also, a hot plate welding property is often not satisfactory.

On the other hand, in the case of formation of a layer made of metal such as aluminum, chromium and the like by a direct vapor deposition method, on the resin compositions disclosed in examples of JP-A Nos. 10-310676 and 2000-336235, sufficient brightness is not necessarily obtained and, level recently required is not attained in some cases.

Regarding the thermoplastic resin composition described in examples of JP-A No. 2000-302824, disclosed is gloss retention after an exposure time of 500 hours in an accelerated exposure weather resistance test by a sunshine weather meter, however, sufficient weather resistance is not obtained for exposure of further longer time and level recently required is not necessarily attained.

SUMMARY OF THE INVENTION

The object of the present invention is to provide a direct vapor depositing resin composition giving beautiful bright appearance after direct vapor deposition, further, having high level impact resistance and weather resistance, and also excellent in a hot plate welding property with a transparent resin such as PMMA resins, PC resins and the like (showing little stringiness), and a molded article and a lamp housing obtained by using this resin composition.

The present invention relates to a direct vapor depositing resin composition comprising at least one selected from the group consisting of the following graft copolymers (A-I) and (A-II).

(A-I): A graft copolymer obtained by graft-polymerizing one or more monomers or a monomer mixture to a complex rubber-like polymer (G) composed of a polyorganosiloxane and a (meth)acrylate-based polymer.

(A-II): A graft copolymer obtained by graft-polymerizing one or more monomers or a monomer mixture including an alkyl (meth)acrylate as an essential component to a rubber-like polymer (R) in which the content of diene units is 30% by weight or less (including 0% by weight) in 100% by weight of the whole rubber-like polymer.

Further, the present invention relates to the above-mentioned direct vapor depositing resin composition comprising a vinyl-based (co)polymer (B) having as a constituent unit at least one selected from the group consisting of aromatic alkenyl units, vinyl cyanide units and alkyl (meth)acrylates.

Furthermore, the present invention relates to the above-mentioned direct vapor depositing resin composition comprising a polycarbonate and/or polyester (C).

Still further, the present invention relates to a molded article obtained by molding the above-mentioned direct vapor depositing resin composition.

Even further, the present invention relates to the above-mentioned molded article of which surface has been metallized by direct vapor deposition.

Even still further, the present invention relates to a lamp housing obtained by metallization by direct vapor deposition of the surface of a molded article obtained by molding the above-mentioned direct vapor depositing resin composition.

BEST MODES FOR CARRYING OUT THE INVENTION

The direct vapor depositing resin composition of the present invention comprises at least one selected from the group consisting of the above-mentioned graft copolymers (A-I) and (A-II). If necessary, the direct vapor depositing resin composition may further contain the above-mentioned vinyl-based (co)polymer (B), and, may contain a polycarbonate and/or polyester (C).

In the direct vapor depositing resin composition of the present invention, particularly when a polycarbonate and/or polyester (C) is not contained, the total content of the graft copolymers (A-I) and (A-II) is preferably from 5 to 100% by weight, more preferably from 5 to 95% by weight based on the total amount of the graft copolymers (A-I) and (A-II) and the vinyl-based (co)polymer (B). Namely, the content of a vinyl-based (co)polymer (B) is preferably from 95 to 0% by weight, more preferably from 95 to 5% by weight based on the total amount of the graft copolymers (A-I) and (A-II) and the vinyl-based (co)polymer (B). The content of the vinyl-based (co)polymer (B) is more preferably 10% by weight or more and more preferably 90% by weight or less based on the total amount of the graft copolymers (A-I) and (A-II) and a vinyl-based (co)polymer (B).

In the direct vapor depositing resin composition of the present invention, it is preferable that the total content of the graft copolymers (A-I) and (A-II) is from 5 to 80% by weight based on the total amount of the graft copolymers (A-I) and (A-II), vinyl-based (co)polymer (B) and polycarbonate and/or polyester (C), the content of the vinyl-based (co)polymer (B) is from 75 to 0% by weight based on the total amount of the graft copolymers (A-I) and (A-II), vinyl-based (co)polymer (B) and polycarbonate and/or polyester (C), and the content of the polycarbonate and/or polyester (C) is from 95 to 20% by weight based on the total amount of the graft copolymers (A-I) and (A-II), vinyl-based (co)polymer (B) and polycarbonate and/or polyester (C).

Particularly, when a vinyl-based (co)polymer (B) is used, its content is preferably 20% by weight or more, particularly 30% by weight or more and preferably 90% by weight or less, particularly 80% by weight or less based on the total amount of the graft copolymers (A-I) and (A-II), vinyl-based (co)polymer (B) and polycarbonate and/or polyester (C).

When a polycarbonate and/or polyester (C) is used, its content is preferably 20% by weight or more, particularly 30% by weight or more and preferably 90% by weight or less, particularly 80% by weight or less based on the total amount of the graft copolymers (A-I) and (A-II), vinyl-based (co)polymer (B) and polycarbonate and/or polyester (C).

By controlling the ratio of a vinyl-based (co)polymer (B) in a resin composition within the above-mentioned range, the rigidity and molding processability of the resulting resin composition are improved. By controlling the ratio of a polycarbonate and/or polyester (C) in a resin composition within the above-mentioned range, objects of compounding such as heat resistance, impact resistance, chemical resistance and the like and the object of the present invention can be attained simultaneously.

In the direct vapor depositing resin composition of the present invention, other thermoplastic resins described later may be compounded in an amount within the range in which various abilities intended in the present invention are not significantly disturbed.

The direct vapor depositing resin composition of the present invention may contain the above-mentioned graft copolymer (A-I) or (A-II), and may also contain the above-mentioned graft copolymers (A-I) and (A-II) together. The graft copolymer (A-I) is not required to be used singly, and two or more copolymers may be used in admixture. The graft copolymer (A-II) is also not required to be used singly, and two or more copolymers may be used in admixture.

The direct vapor depositing resin composition of the present invention may contain other graft copolymers than the graft copolymers (A-I) and (A-II), and it is preferable that the graft copolymers (A-I) and (A-II) are used in a ratio of 60% by weight or more based on all graft copolymers. It is further preferable that the graft copolymers (A-I) and (A-II) are used in a ratio of 100% by weight based on all graft copolymers.

A molded article made of such a direct vapor depositing resin composition of the present invention can be subjected to surface metallizing treatment by which a metal layer of aluminum, chromium and the like is formed on the surface of a molded article by a vacuum vapor depositing or sputtering method, without effecting special pre-treatment such as formation of an under coat-treated layer and the like. A bright molded article obtained by this direct vapor depositing method shows a beautiful bright appearance without surface haze, since the surface smoothness of a molded article made of the direct vapor depositing resin composition of the present invention is excellent.

The direct vapor depositing resin composition of the present invention is excellent both in impact resistance and weather resistance.

Further, a molded article made of the direct vapor depositing resin composition of the present invention can be bonded to a transparent resin such as a PC resin, PMMA resin and the like by the hot plate welding method. Additionally, a stringing phenomenon scarcely occurs in this procedure, the appearance of the bonded part is excellent, and its bonding strength is also sufficiently high.

Therefore, the direct vapor depositing resin composition of the present invention is suitable for, for example, lamp housings and the like, and automobile lamps excellent in brightness, appearance, weather resistance and impact resistance can be produced efficiently according to the present invention.

The present invention will be described in detail below.

The polyorganosiloxane constituting the graft copolymer (A-I) according to the present invention preferably contains silicon atoms having three or more siloxane bonds in an amount of 1 mol % or less (including 0 mol %) based on all silicon atoms in polydimethylsiloxane. When this amount is 1 mol % or less, the finally resulted resin composition is excellent in impact resistance. This amount is further preferably 0.8 mol % or less since then the resulted resin composition is excellent both in impact resistance and brightness after direct vapor deposition.

The method of controlling the amount of silicon atoms having three or more siloxane bonds is not particularly restricted, and as an example, it is preferable to decrease the ratio of silicon-based monomers used for forming a cross-linked structure such as ethyl orthosilicate, tetraethoxysilane and the like in producing a polyorganosiloxane, and it is more preferable to use no silicon-based monomers used for forming a cross-linked structure.

Further, it is preferable, in producing a polyorganosiloxane, to use an organosiloxane containing a vinyl-polymerizable functional group. The amount of organosiloxane units containing a vinyl polymerizable functional group in a polyorganosiloxane is preferably 0.3 mol % or more since then complexation of a polyorganosiloxane with (meth)acrylate rubber progresses sufficiently, a polyorganosiloxane scarcely bleeds out on the surface of the finally resulted resin composition molded article, and brightness after direct vapor deposition of a molded article and close adherence between a metal and a resin are excellent. It is further preferable that the amount of organosiloxane units containing a vinyl-polymerizable functional group in a polyorganosiloxane is 0.5 mol % or more since then the finally obtained resin composition is excellent both in impact resistance and brightness after direct vapor deposition.

The amount of organosiloxane units containing a vinyl-polymerizable functional group in a polyorganosiloxane is preferably 3 mol % or less since then the finally obtained resin composition is excellent in impact resistance. Further, the amount of organosiloxane units containing a vinyl-polymerizable functional group in a polyorganosiloxane is further preferably 2 mol % or less, particularly 1 mol % or less since then the finally obtained resin composition is excellent both in impact resistance and brightness after direct vapor deposition.

As the polyorganosiloxane, particularly, it is preferable to use a polyorganosiloxane composed of 0.3 to 3 mol % of organosiloxane units containing a vinyl-polymerizable functional group and 97 to 99.7 mol % of a dimethylsiloxane unit in which the amount of silicon atoms having three or more siloxane bonds is 1 mol % or less (including 0 mol %) based on all silicon atoms in the polyorganosiloxane.

As the dimethylsiloxane used in producing a polyorganosiloxane, tri- or more-cyclic dimethylsiloxane-based cyclic bodies are listed, and tri to hepta-cyclic bodies are preferable. Specifically listed are hexamethylcyclotrisiloxane, octamethylcyclotetrasiloxane, decamethylcyclopentasiloxane, dodecamethylcyclohexasiloxane and the like. These are used alone or in combination of two or more.

The organosiloxane containing a vinyl-polymerizable functional group which can be used in production of a polyorganosiloxane contains a vinyl-polymerizable functional group and can be bonded to dimethylsiloxane via a siloxane bond. In view of reactivity with dimethylsiloxane, it is preferable to use various alkoxysilane compounds containing a vinyl-polymerizable functional group. Specifically listed are methacryloyloxysiloxane such as β-methacryloyloxyethyldimethoxymethylsilane, γ-methacryloyloxypropyldimethoxymethylsilane, γ-methacryloyloxypropylmethoxydimethylsilane, γ-methacryloyloxypropyltrimethoxysilane, γ-methacryloyloxypropylethoxydiethylsilane, γ-methacryloyloxypropyldiethoxymethylsilane, δ-methacryloyloxybutyldiethoxymethylsilane and the like, vinyl siloxanes such as tetramethyltetravinylcyclotetrasiloxane and the like, p-vinylphenyldimethoxymethylsilane, further, mercaptosiloxanes such as γ-mercaptopropyldimethoxymethylsilane, γ-mercaptopropyltrimethoxysilane and the like. These organosiloxanes having a vinyl-polymerizable functional group can be used alone or in admixture of two or more.

The size of a polyorganosiloxane is not particularly restricted, and the average particle size is preferably 600 nm or less, particularly 200 nm or less for the purpose of enhancing brightness after direct vapor deposition of the finally obtained resin composition.

The method of producing a polyorganosiloxane is not particularly restricted, and the following method is mentioned as one example. First, in a mixture composed of dimethylsiloxane and an organosiloxane containing a vinyl-polymerizable functional group, an emulsifier and water are added and emulsified, to obtain latex. Then, this latex is finely granulated by using a homo-mixer of finely granulating by shearing force generated by high speed rotation, a homogenizer of finely granulating by injection force generated by a high pressure generator, and the like. Use of a high pressure emulsifying apparatus such as a homogenizer and the like is preferable since then the distribution of the particle size of the polyorganosiloxane latex is small. This latex after fine granulation is added in an acid aqueous solution containing an acid catalyst, and polymerized under high temperature. Termination of polymerization can be conducted by cooling the reaction solution, further, neutralizing the solution with an alkaline substance such as sodium hydroxide, potassium hydroxide, sodium carbonate and the like.

Regarding addition of an acid catalyst, an acid catalyst may be previously mixed with a siloxane mixture, emulsifier and water, or an acid aqueous solution of high temperature may be dropped at a constant speed into latex in which a siloxane mixture has been finely granulated. However, it is preferable that latex in which a siloxane mixture has been finely granulated is dropped at a constant speed into an acid aqueous solution of high temperature, since then the particle size of the resulted polyorganosiloxane can be controlled easily.

The polymerization time is, when an acid catalyst is mixed and granulated with a siloxane mixture, emulsifier and water before polymerization, preferably 2 hours or longer, particularly 4 hours or longer. In the case of the method in which latex in which a siloxane mixture has been finely granulated is dropped into an aqueous solution of an acid catalyst, it is preferable to keep the reaction solution for about 1 hour after completion of addition of the latex.

The polymerization temperature is preferably 50° C. or more, particularly 80° C. or more. The upper limit of the polymerization temperature is not particularly restricted, and usually about 95° C.

Preferable as the emulsifier used are anionic emulsifiers such as sodium alkylbenzensulfonates, sodium polyoxyethylene alkyl phenyl ether sulfates and the like, and of them, sulfonic acid-based emulsifiers such as sodium alkylbenzenesulfonates, sodium laurylsulfonate and the like are particularly preferable. These emulsifiers may be used alone or in combination of two or more. The use amount of an emulsifier is preferably 0.05 parts by weight or more based on 100 parts by weight of a siloxane mixture since then dispersed conditions is usually stable and emulsified condition of fine particles can be kept, and preferably 5 parts by weight or less based on 100 parts by weight of a siloxane mixture since then the color of a molded article is scarcely influenced by the color of an emulsifier itself or by deterioration of a resin composition ascribable to it.

Listed as the acid catalyst used in polymerization of a polyorganosiloxane are sulfonic acids such as aliphatic sulfonic acids, aliphatic substituted benzenesulfonic acids, aliphatic substituted naphthalenesulfonic acids and the like, and mineral acids such as sulfuric acid, hydrochloric acid, nitric acid and the like. These acid catalysts may be used alone or in combination of two or more. As the acid catalyst, aliphatic substituted benzenesulfonic acids are preferable and n-dodecylbenzenesulfonic acid is particularly preferable because of excellent action of stabilizing polyorganosiloxane latex. When n-dodecylbenzenesulfonic acid is combined with a mineral acid such as sulfuric acid and the like, an influence exerted by the color of an emulsifier used in polyorganosiloxane latex on the color of a resin composition molded article can be suppressed to lower level. The addition amount thereof may be appropriately determined, and usually from about 0.1 to 20 parts by weight based on 100 parts by weight of a siloxane mixture.

The (meth)acrylate-based polymer constituting the complex rubber-like polymer (G) used in the graft copolymer (A-I) is obtained by polymerizing an alkyl (meth)acrylate monomer, or a monomer mixture containing one or more alkyl (meth)acrylates. The (meth)acrylate-based polymer may contain other monomers than the alkyl (meth)acrylate monomer.

Listed as the alkyl (meth)acrylate monomer are, for example, alkyl acrylates such as methyl acrylate, ethyl acrylate, n-propyl acrylate, n-butyl acrylate, 2-ethylhexyl acrylate and the like, and alkyl methacrylates such as hexyl methacrylate, 2-ethylhexyl methacrylate, n-lauryl methacrylate and the like. Of them, n-butyl acrylate is preferably used since then the resulted resin composition is excellent in impact resistance. These may be used alone or in combination of two or more.

Polymerization can be conducted according to known methods. As described later, a graft crossing agent or cross-linking agent may be used.

The method of producing a complex rubber-like polymer (G) used in the present invention is not particularly restricted, and there are listed a method in which separate latexes of a polyorganosiloxane and a (meth)acrylate-based polymer are hetero-aggregated or co-thickened, a method in which, in the presence of any one or more latexes, monomers (including also a mixture) forming other one or more polymers are polymerized and complexed, and other methods. Of them, a method is preferable in which (meth)acrylate monomers (including also a mixture) as described above are polymerized in the presence of an organosiloxane in the form of latex since then the resulted resin composition is excellent in impact resistance and brightness after direct vapor deposition.

If necessary, it is also possible to use a graft crossing agent and a cross-linking agent in this procedure. Listed as the graft crossing agent and cross-linking agent which can be used are, for example, allyl methacrylate, triallyl cyanurate, triallyl isocyanurate, divinylbenzene, ethylene glycol dimethacrylate, propylene glycol dimethacrylate, 1,3-butylene glycol dimethacrylate, 1,4-butylene glycol dimethacrylate and the like. These may be used alone or in combination of two or more. The addition amount thereof may be appropriately determined, and is preferably from about 0.3 to 6 parts by weight based on 100 parts by weight of (meth)acrylate monomers (including also a mixture) since then the resulted resin composition is excellent in impact resistance and brightness after direct vapor deposition.

A monomer mixture constituted of these alkyl (meth)acrylates, and if necessary, a graft crossing agent and a cross-linking agent can be radical-polymerized in bulk, continuously or intermittently to a polyorganosiloxane in the form of latex, to obtain a polyorganosiloxane/(meth)acrylate-based complex rubber-like polymer (G).

Regarding the ratio of polyorganosiloxane/(meth)acrylate-based polymer constituting a complex rubber-like polymer (G), it is preferable that the content of a polyorganosiloxane in a complex rubber-like polymer (G) is 1% by weight or more based on the total amount of a polyorganosiloxane and a (meth)acrylate-based polymer (monomer mixture) since then the resulted resin composition is excellent in impact resistance. On the other hand, the content of a polyorganosiloxane in a complex rubber-like polymer (G) is preferably 99% by weight or less, more preferably 90% by weight or less based on the total amount of a polyorganosiloxane and a (meth)acrylate-based polymer (monomer mixture) since then the resulted resin composition is excellent in balance of impact resistance and brightness after direct vapor deposition. When the amount of a polyorganosiloxane in a complex rubber-like polymer (G) is in this range, the resulted resin composition is excellent in impact resistance and brightness after direct vapor deposition. The amount of a polyorganosiloxane in a complex rubber-like polymer (G) is further preferably 2% by weight or more, particularly 3% by weight or more, and further preferably 50% by weight or less, particularly 10% by weight or less based on the total amount of a polyorganosiloxane and a (meth)acrylate-based polymer (monomer mixture).

The average particle size of a complex rubber-like polymer (G) is not particularly restricted, and preferably less than 400 nm, further preferably 300 nm or less since then the resulted resin composition is excellent in bright appearance after direct vapor deposition. The lower limit of the average particle size of a complex rubber-like polymer (G) is not particularly restricted, and usually about 30 nm.

It is preferable that the ratio of rubber-like polymers having a particle size of 500 nm or more is 4% by weight or less (including 0% by weight), particularly 3% by weight or less, further 2% by weight or less based on 100% by weight of all rubber-like polymers including a complex rubber-like polymer (G) since then a molded article having a beautiful bright appearance is obtained.

The graft copolymer (A-I) can be produced by emulsion-graft-polymerizing vinyl-based monomers, preferably, at least one monomer component selected from the group consisting of aromatic alkenyl compounds, alkyl (meth)acrylates and vinyl cyanide compounds to a complex rubber-like polymer (G) described above.

Of monomer components, styrene, α-methylstyrene, vinyltoluene and the like are listed, for example, as the aromatic alkenyl compound. As the alkyl (meth)acrylate, for example, methyl methacrylate, ethyl methacrylate, 2-ethylhexyl methacrylate, methyl acrylate, ethyl acrylate, butyl acrylate and the like are listed. As the vinyl cyanide compound, for example, acrylonitrile, methacrylonitrile and the like are listed. Of them, a mixture of styrene and acrylonitrile is preferably used as the monomer component since then the resulted resin composition is excellent in impact resistance. The content of styrene in 100% by weight of this mixture is preferably 10% by weight or more, and preferably 90% by weight or less. On the other hand, it is preferable to use methyl methacrylate alone or a mixture containing methyl methacrylate in an amount preferably of 50% by weight or more since then the resulted resin composition is excellent in brightness after direct vapor deposition. These can be appropriately selected depending on the object.

Regarding the weight ratio of a complex rubber-like polymer (G) and a vinyl-based monomer used in graft polymerization, in emulsion-graft-polymerization, it is preferable that the content of a complex rubber-like polymer (G) is 10% by weight or more and the content of a vinyl-based monomer is 90% by weight or less (in total: 100% by weight, the same in the followings) since then the finally resulted resin composition is excellent in impact resistance and also excellent in brightness after direct vapor deposition. On the other hand, regarding the weight ratio of a complex rubber-like polymer (G) and a vinyl-based monomer used in emulsion-graft-polymerization, it is preferable that the content of a complex rubber-like polymer (G) is 80% by weight or less and the content of a vinyl-based monomer is 20% by weight or more since then the finally resulted resin composition is excellent in impact resistance. When emulsion-graft-polymerization is conducted at such a weight ratio, the finally resulted resin composition is excellent in impact resistance, flowability and brightness after direct vapor deposition.

Particularly, regarding the weight ratio of a complex rubber-like polymer (G) and a vinyl-based monomer used in emulsion-graft-polymerization, it is preferable that the content of a complex rubber-like polymer (G) is 30% by weight or more and the content of a vinyl-based monomer is 70% by weight or less, and it is preferable that the content of a complex rubber-like polymer (G) is 70% by weight or less and the content of a vinyl-based monomer is 30% by weight or less. When emulsion-graft-polymerization is conducted at such a weight ratio, the finally resulted resin composition manifests excellent impact resistance and direct vapor deposition appearance excellent in brightness in good balance.

The graft copolymer (A-I) can be produced by radical polymerization using an emulsifier. In monomer components, various chain transfer agents for controlling the graft ratio and the molecular weight of graft components, for example, mercaptan-based compounds, terpene-based compounds, α-methylstyrene dimer and the like may be added. The polymerization conditions are not particularly restricted, and can be appropriately selected depending on necessity.

As the radical polymerization initiator used in producing a graft copolymer (A-I) and a (meth)acrylate-based polymer in a complex rubber-like polymer (G) described above, peroxides, azo-based initiators, redox type initiators prepared by combining oxidizer and reducing agents, and the like can be used. Of them, redox type initiators are preferably used, and particularly, it is preferable to use redox type initiators combining ferrous sulfate.sodium pyrophosphate.glucose.hydroperoxide or ferrous sulfate.disodium ethylenediamine tetraacetate.rongalite.hydroperoxide.

The emulsifier used in producing a graft copolymer (A-I) and a (meth)acrylate-based polymer in a complex rubber-like polymer (G) described above is not particularly restricted. Since an emulsifier used in production of a polyorganosiloxane is contained in a complex rubber-like polymer (G), this may be used itself, and if necessary, other emulsifiers may further be added. As the emulsifier which can be used in this case, it is preferable to use various salts of carboxylic acids such as sodium sarcocinate, fatty potassium, fatty sodium, dipotassium alkenylsuccinate, rosin soap and the like, and anionic emulsifiers such as alkyl sulfates, sodium alkylbenzenesulfonates, sodium polyoxyethylene alkylphenyl ether sulfate and the like since then the stability of latex in emulsion-polymerization is excellent and polymerization ratio is enhanced. These are classified and used depending on the object. Further, it may also be permissible that the emulsifier used in preparation of a complex rubber-like polymer (G) is used as it is and emulsifiers are not additionally added in emulsion-graft-polymerization.

The graft copolymer (A-II) used in the present invention is obtained by graft-polymerizing one or more monomers or a monomer mixture including an alkyl (meth)acrylate as an essential component to a rubber-like polymer (R) in which the content of diene units is 30% by weight or less (including 0% by weight) in 100% by weight of all rubber-like polymers contained in a resin composition. The graft copolymer (A-II) may be used singly or in combination of two or more, and can be selected optionally depending on its application.

The rubber-like polymer (R) which can be used is not particularly restricted excepting the above-mentioned conditions, and exemplified are diene-based rubber such as polybutadiene rubber, styrene-butadiene rubber, acrylonitrile-butadiene rubber, butyl acrylate-butadiene rubber and the like, acrylic rubber such as butyl acrylate rubber, butadiene-butyl acrylate rubber, 2-ethylhexyl acrylate-butyl acrylate rubber, 2-ethylhexyl methacrylate-butyl acrylate rubber, stearyl acrylate-butyl acrylate rubber, dimethylsiloxane-butyl acrylate rubber, silicone/butyl acrylate complex rubber and the like, polyolefin-based rubber polymers such as ethylene-propylene rubber, ethylene-propylene-diene rubber and the like, silicone-based rubber polymers such as polydimethylsiloxane rubber and the like. These can be used alone or in combination of two or more. Of course, the diene unit ratio is restricted in diene-based rubber.

In these rubber-like polymers (R), the content of diene units in 100% by weight of all rubber-like polymers is 30% by weight or less, preferably 10% by weight or less, further preferably less than 1% by weight since then the resulted resin composition is excellent in weather resistance.

It is preferable that the rubber-like polymer (R) contains at least one monomer of alkyl acrylates having an alkyl group containing 2 to 8 carbon atoms, more preferably 4 to 8 carbon atoms such as methyl acrylate, ethyl acrylate, n-butyl acrylate, n-propyl acrylate, 2-ethylhexyl acrylate and the like, and it is preferable that the ratio of alkyl acrylate units having an alkyl group containing 2 to 8 carbon atoms in the rubber-like polymer (R) is from 70 to 90% by weight since then the resulted resin composition is excellent in weather resistance, brightness after direct vapor deposition and the appearance of a hot plate welding connected part.

Further, in the rubber-like polymer (R), copolymerizable vinyl-based monomers other than the above-mentioned monomers can be introduced in an amount of 30% by weight or less. Such vinyl-based monomers are not particularly restricted, and examples thereof include aromatic vinyl-based monomers such as styrene, α-methylstyrene, vinyltoluene and the like, vinyl cyanide monomers such as acrylonitrile, methacrylonitrile, graft crossing agents and cross-linking agents such as allyl methacrylate, triallyl cyanurate, triallyl isocyanurate, divinylbenzene, ethylene glycol dimethacrylate, propylene glycol dimethacrylate, 1,3-butylene glycol dimethacrylate, 1,4-butylene glycol dimethacrylate and the like, and other monomers. These may be used alone or in combination of two or more.

The graft components of the graft copolymer (A-II) are composed of one or more monomers or a monomer mixture including an alkyl (meth)acrylate as an essential component, or one or more monomers or a monomer mixture including an alkyl (meth)acrylate as an essential component, and other vinyl-based monomers copolymerizable with them.

Examples of the alkyl (meth)acrylate used include methyl (meth)acrylate, ethyl (meth)acrylate, n-propyl (meth)acrylate, n-butyl (meth)acrylate, 2-ethylhexyl (meth)acrylate and the like. These may be used alone or in combination of two or more. Of them, it is preferable to use methyl methacrylate since then the resulted resin composition is excellent in balance of impact resistance and brightness after direct vapor deposition.

The copolymerizable other vinyl-based monomers are not particularly restricted, and the above-mentioned aromatic vinyl-based monomers, vinyl cyanide-based monomers and the like are listed.

The content of an alkyl (meth)acrylate in 100% by weight of all graft components (the above-mentioned one or more monomers or a monomer mixture including a alkyl (meth) acrylate as an essential component, to be graft-polymerized to a rubber-like polymer (R)) is preferably from 20 to 100% by weight, more preferably from 50 to 100% by weight, further preferably from 70 to 100% by weight, particularly preferably from 80 to 100% by weight since then the resulted resin composition is excellent in weather resistance, and brightness after direct vapor deposition.

The method of producing a graft copolymer (A-II) is not particularly restricted, and for example, a graft copolymer (A-II) can be produced by emulsion-graft-polymerizing one or more monomer components (one or more monomers or a monomer mixture) to the above-mentioned rubber-like polymer (R).

Regarding the weight ratio of a rubber-like polymer (R) and one or more monomers or a monomer mixture used in graft polymerization, in emulsion-graft-polymerization, the content of a rubber-like polymer (R) in 100% by weight of a graft copolymer (A-II) is preferably 10% or more, more preferably 30% or more, and preferably 90% by weigh or less, more preferably 80% by weight or less. When emulsion-graft-polymerization is conduced at such a weight ratio, the finally resulted resin composition manifests excellent impact resistance and a direct vapor deposition appearance excellent in brightness, in good balance.

The graft copolymer (A-II) can be produced by radical-polymerization using an emulsifier. Usually, a rubber-like polymer (R) is previously produced by emulsion-polymerization, and then one or more monomers or a monomer mixture as graft components are added to this rubber-like polymer latex, and they are graft-polymerized to obtain a graft copolymer (A-II). In monomer components, various chain transfer agents for controlling the graft ratio and the molecular weight of graft components, for example, mercaptan-based compounds, terpene-based compounds, α-methylstyrene dimer and the like may be added. The polymerization conditions are not particularly restricted, and can be appropriately selected depending on necessity.

As the radical polymerization initiator used in producing a rubber-like polymer (R) and a graft copolymer (A-II), peroxides, azo-based initiators, redox type initiators prepared by combining oxidizer and reducing agents, and the like can be used. Of them, redox type initiators are preferably used, and particularly, it is preferable to use redox type initiators combining ferrous sulfate.sodium pyrophosphate.glucose.hydroperoxide or ferrous sulfate.disodium ethylenediamine tetraacetate.rongalite.hydroperoxide.

The emulsifier used in producing a rubber-like polymer (R) and a graft copolymer (A-II) is not particularly restricted, it is preferable to use various salts of carboxylic acids such as sodium sarcocinate, fatty potassium, fatty sodium, dipotassium alkenylsuccinate, rosin soap and the like, and anionic emulsifiers such as alkyl sulfates, sodium alkylbenzenesulfonates, sodium polyoxyethylene alkylphenyl ether sulfate and the like since then the stability of latex in emulsion-polymerization is excellent and polymerization ratio is enhanced. These are classified and used depending on the object. Further, it may also be permissible that the emulsifier used in preparation of a rubber-like polymer (R) is used as it is and emulsifiers are not additionally added in emulsion-graft-polymerization.

The latex of graft copolymers (A) obtained by emulsion-graft-polymerization [graft copolymers (A-I) and (A-II)] can be recovered as a graft copolymer (A) by, for example, a wet method in which it is added into hot water containing a dissolved coagulant to cause coagulation in the form of slurry, a spray dry method in which a graft copolymer (A) latex is sprayed into a heated atmosphere to recover a graft copolymer (A) semi-directly, and the other methods.

As the coagulant used in the wet recovering method, inorganic acids such as sulfuric acid, hydrochloric acid, phosphoric acid, nitric acid and the like, and metal salts such as potassium chloride, calcium acetate, aluminum sulfate, alum and the like, can be used. The coagulant used is selected in a pair with an emulsifier used in polymerization. Namely, when carboxylic acid soaps such as fatty soaps and rosin soap and the like are only used as the emulsifier, a graft copolymer (A) can be recovered using any coagulant, however, when an emulsifier showing stable emulsification power also in an acid region such as a sodium alkylbenzenesulfonate is contained, the above-mentioned inorganic acids are insufficient, and it is necessary to use a metal salt as a coagulant.

For obtaining a graft copolymer (A) in dry condition from a graft copolymer (A) in the form of slurry obtained by the wet recovering method, after a process such as a method in which first, a remaining emulsifier residue is eluted in water and washed, then, this slurry is dehydrated by centrifugation, press dehydrator and the like, then, dried by an air flow drier and the like or a method in which dehydration and drying are conducted simultaneously by a squeezing dehydrator, extruder and the like, a dried graft copolymer (A) can be obtained in the form of powder or granule. Further, in this procedure, it is also possible that which discharged from a squeezing dehydrator or extruder is carrier directly to an extruder or a molding machine for producing a resin composition, to give a molded article.

The vinyl-based (co)polymer (B) which can be used in the resin composition of the present invention is a (co)polymer having as a constituent unit at least one selected from the group consisting of aromatic alkenyl units, vinyl cyanide units and alkyl (meth)acrylate units, namely, is a (co)polymer obtained by polymerizing monomers (also including a mixture) including any one or more of aromatic alkenyl compounds, vinyl cyanide compounds and alkyl (meth)acrylate compounds. By inclusion of the vinyl-based (co)polymer (B), other effects than the object of the present invention such as improvement in molding processability of the resulted resin composition, impartment of heat resistance, and the like can be obtained, and can be selected depending on its object.

Further, the vinyl-based (co)polymer (B) may be a copolymer obtained by polymerizing a monomer mixture containing monomers other than aromatic alkenyl compounds, vinyl cyanide compounds and alkyl (meth)acrylate compounds, and for example, it is also preferable that the vinyl-based (co)polymer (B) is a copolymer obtained by polymerizing a monomer mixture composed of an aromatic alkenyl compound, vinyl cyanide compound and N-substituted maleimide.

As the aromatic alkenyl units, vinyl cyanide units and alkyl (meth)acrylate units constituting them, the same compounds as those used in the above-mentioned graft polymerization can be used.

As the other monomer components than these compounds, maleimide-based monomers, maleic anhydride and the like are listed. As the maleimide-based monomer, for example, maleimide, N-methylmaleimide, N-ethylmaleimide, N-phenylmelaimide, N-propylmaleimide, N-cyclohexylmaleimide and the like are listed.

As the vinyl-based (co)polymer (B), resins such as an acrylonitrile-styrene copolymer (SAN) resin, polymethyl methacrylate (PMMA) resin, styrene-methyl methacrylate copolymer (MS) resin, acrylonitrile-α methylstyrene copolymer (αSAN) resin, styrene-acrylonitrile-N-phenylmaleimide ternary copolymer (SAM) resin, polystyrene resin, acrylonitrile-styrene-methyl methacrylate ternary copolymer and the like are specifically preferable. The vinyl-based (co)polymer (B) may be used alone or in combination of two or more.

A vinyl-based (co)polymer (B) having any molecular weight can be used.

The polycarbonate (C) which can be used in the resin composition of the present invention is composed of a dihydroxydiarylalkane, and may be branched optionally. By inclusion of the polycarbonate (C), the heat resistance and impact resistance of the resulted resin composition can be improved.

The dihydroxyarylalkane may have an alkyl group, chlorine atom or bromine atom at the ortho position to a hydroxyl group. Preferable as the dihydroxyarylalkane are 4,4'-dihydroxy-2,2'-diphenylpropane (bisphenol A), tetramethyl bisphenol A, bis(4-hydroxyphenyl)-p-diisopropylbenzene and the like.

As the polycarbonate (C), those having any molecular weight can be used.

The polycarbonate (C) can be produced by a known method, and in general, produced by reacting a dihydroxy compound or a polyhydroxy compound with a phosgene or a diester of carbonic acid.

A branched polycarbonate is produced by substituting a part of a dihydroxy compound, for example, 0.2 to 2 mol % of this with a polyhydroxy compound. As the polyhydroxy compound, there are listed 1,4-bis(4',4,2-dihydroxytriphenylmethyl)-benzene, phloroglucinol, 4,6-dimethyl-2,4,6-tri(4-hydroxyphenyl)-heptene-2,4,6-dimethyl-2,4,6-tri(4-hydroxyphenyl)heptane, 1,3,5-tri(4-hydroxyphenyl)-benzene, 1,1,1-tri(4-hydroxyphenyl)-ethane, 2,2-bis[4,4'-(4,4'-dihydroxyphenyl)cyclohexyl]propane and the like.

The polycarbonate (C) may be used alone or in combination of two or more.

The polyester (C) which can be used in the resin composition of the present invention is mainly composed of a polyalkylene terephthalate, and preferably contains, in a ratio of 50% by weight or more, that composed of an aromatic dicarboxylic acid having 8 to 22 carbon atoms and an alkylene glycol or cycloalkylene glycol having 2 to 22 carbon atoms. By inclusion of the polyester (C), the molding processability and chemical resistance of the resulted resin composition can be improved.

The polyester (C) may also contain, if necessary, an aliphatic dicarboxylic acid, for example, adipic acid, sebacic acid and the like, as a constituent unit, in an amount preferably of 80% by weight or less. Also, the polyester (C) may contain a polyalkylene glycol such as polyethylene glycol and the like as a constituent unit.

As the polyester (C) used, polyethylene terephthalate, polytetramethylene terephthalate and the like are particularly preferable.

As the polyester (C), those having any molecular weight can be used.

The polyester (C) may be used alone or in combination of two or more.

When these polycarbonates and polyesters are used, each of them may be used singly, or they may be used in any ratio, if necessary.

In the direct vapor depositing resin composition of the present invention, other thermoplastic resins may be compounded in an amount within the range in which various abilities intended in the present invention are not significantly disturbed, if necessary.

The other thermoplastic resin is not particularly restricted, and examples thereof include polyolefins such as polyvinyl chloride, polyethylene, polypropylene and the like, styrene-based elastomers such as styrene-butadiene-styrene (SBS), styrene-butadiene (SBR), hydrogenated SBS, styrene-isoprene-styrene (SIS) and the like, various olefin-based elastomers, various polyester-based elastomers, polyacetal resins, modified polyphenylene ethers (modified PPE resins), ethylene-vinyl acetate copolymer, PPS resin, PES resin, PEEK resin, polyallylate, liquid crystal polyester resins, polyamide resins (nylon) and the like, and ABS resins, ASA resins and styrene-acrylonitrile-silicone (SAS) resin and the like out of the range of the present invention. These other thermoplastic resins may be used alone or in combination of two or more.

The use amount of these other thermoplastic resins is preferably 80 parts by weight or less in 100 parts by weight of a resin composition.

The resin composition of the present invention can be produced by mixing and dispersing a graft copolymer (A), if necessary, a vinyl-based (co)polymer (B), polycarbonate and/or polyester (C), other thermoplastic resin by a V shaped blender or Henschel mixer and the like, and melt kneading this mixture by using an extruder or a kneader such as a Banbury mixer, press kneader, roll and the like.

The resulted direct vapor depositing resin composition of the present invention can be used itself, or if necessary, after compounding of additives such as dyes, pigments, heat stabilizers, weather resistant aids, reinforcing agents, fillers, flame retardants, flame retardant aids, foaming agents, lubricants, plasticizers, antistatic additives and the like, as a production raw material of a molded article. The resin composition can be made into the intended molded article by various molding methods such as an injection molding method, extrusion molding method, blow molding method, compression molding method, calender molding method, inflation molding method and the like.

The molded article made of the resin composition of the present invention which has been primary-processed by the above-mentioned various molding methods can be subjected to surface metallizing treatment with aluminum, chromium and the like by a vacuum vapor deposition method or sputtering method, without special pre-treatment such as formation of an undercoat-treated layer and the like, as described above. This metallized bright surface may be left as it is, however, for protecting the surface from generation of flaw by dust and the like, it is also possible to effect top coat treatment of forming a coat made of a silicon-based material and the like by painting and the like.

As the industrial application examples of these resin compositions of the present invention, listed are automobile parts, particularly, housings of head lamps and tail lamps, domestic electric parts such as illumination equipment housings and the like, OA equipment housings, interior members and the like.

The direct vapor depositing resin composition of the present invention is, particularly, suitable for lamp housings. A brightening-treated lamp housing molded article obtained by metallizing by direct vapor deposition of the surface of a molded article obtained by molding the direct vapor depositing resin composition of the present invention is made into contact with a resin made of a PC resin, PMMA resin and the like by a method such as hot plate welding, vibration welding and the like. The molded article of the present invention is particularly suitable for hot plate welding since it is excellent in stringing property.

EXAMPLES

The following examples and comparative examples will illustrated the present invention further specifically, but do not limit the scope of the invention. % and parts in the following examples and comparative examples are by weight unless otherwise stated.

Production Example 1

Production of Polyorganosiloxane (L-1) Latex

| Octamethylcyclotetrasiloxane | 98 parts |
|---|---|
| γ-methacryloyloxypropyldimethoxymethylsilane | 2 parts | were mixed to obtain 100 parts of a siloxane-based mixture. To this was added an aqueous solution composed of

| sodium dodecylbenzenesulfonate | 0.67 parts |
|---|---|
| ion exchanged water | 300 parts, | and the mixture was stirred for 2 minutes by a homomixer at 10000 rotations/min., then, passed through a homogenizer under a pressure of 20 MPa, to obtain a stable pre-mixed organosiloxane latex.

On the other hand, into a reactor equipped with a reagent injection vessel, cooling tube, jacket heater and stirring apparatus was charged

| dodecylbenzenesulfonic acid | 10 parts |
|---|---|
| ion exchanged water | 90 parts, | to prepare a 10% dodecylbenzenesulfonic acid aqueous solution.

This aqueous solution was heated to 85° C. and under this condition, previously mixed organosiloxane latex was dropped over 4 hours, and after completion of addition, its temperature was maintained for 1 hour, then, cooled to 40° C. or lower. Then, the reaction product was neutralized with a sodium hydroxide aqueous solution to pH 7, completing polymerization.

Thus obtained polyorganosiloxane (L-1) latex was dried at 170° C. for 30 minutes, and the solid content was measured to find it was 17.7%. The average particle size of the polyorganosiloxane (L-1) in latex was 50 nm, and the ratio of rubber-like polymers having a particle size of 500 nm or more was about 0%. The content of organosiloxane units having a vinyl polymerizable functional group in polydimethylsiloxane was 0.65 mol %, and the content of silicon atoms having three or more siloxane bonds was 0 mol % based on all silicon atoms in polydimethylsiloxane.

Production Example 2

Production of Polyorganosiloxane (L-2) Latex

| | |
|---|---|
| Octamethylcyclotetrasiloxane | 95.5 parts |
| γ-methacryloyloxypropyldimethoxymethylsilane | 0.5 parts |
| tetraethoxysilane | 4 parts | were mixed to obtain 100 parts of a siloxane-based mixture. To this was added an aqueous solution composed of

| | |
|---|---|
| dodecylbenzenesulfonic acid | 1 part |
| sodium dodecylbenzesulfonate | 1 part |
| ion exchanged water | 200 parts, | and the mixture was stirred for 2 minutes by a homomixer at 10000 rotations/min., then, passed through a homogenizer under a pressure of 20 MPa, to obtain a stable pre-mixed organosiloxane latex.

This pre-mixed organosiloxane latex was charged into a reactor equipped with a cooling tube, jacket heater and stirring apparatus, and the mixture was heated at 80° C. for 5 hours, then, cooled to about 20° C., and left as it was for 48 hours. Then, the reaction product was neutralized with a sodium hydroxide aqueous solution to pH 7, completing polymerization.

Thus obtained polyorganosiloxane (L-2) latex was dried at 170° C. for 30 minutes, and the solid content was measured to find it was 36.5%. The average particle size of the polyorganosiloxane (L-2) in latex was 160 nm, and the ratio of rubber-like polymers having a particle size of 500 nm or more was 0.3%. The content of organosiloxane units having a vinyl polymerizable functional group in polydimethylsiloxane was 0.3 mol %, and the content of silicon atoms having three or more siloxane bonds was 1.5 mol % based on all silicon atoms in polydimethylsiloxane.

Production Example 3

Production of Polyorganosiloxane (L-3) Latex

Polymerization was conducted in the same manner as in Production Example 1 except that the siloxane mixture used was constituted of 96 parts of octamethylcyclotetrasiloxane, 2 parts of γ-methacryloyloxypropyldimethoxymethylsilane, and 2 parts of tetraethoxysilane, and as a result, the solid content was 17.3%, the average particle size was 50 nm, the ratio of rubber-like polymers having a particle size of 500 nm or more was about 0%, the content of methacryloxysiloxane units was 0.7 mol %, and the content of silicon atoms having three or more siloxane bonds was 1.2 mol %.

Production Example 4

Production of Polyorganosiloxane/Acrylate Complex Rubber-Based Graft Copolymer (A-I-1)

Into a reactor equipped with a reagent injection vessel, cooling tube, jacket heater and stirring apparatus was charged

| | |
|---|---|
| polyorganosiloxane latex (L-1) produced in Production Example 1 (solid content) | 8 parts |
| Emal NC-35 (polyoxyethylene alkylphenyl ether sulfate; manufactured by Kao Corp.) | 0.2 parts |
| ion exchanged water | 148.5 parts, | and they were mixed, then, to this was added a mixture composed of

| | |
|---|---|
| n-butyl acrylate | 42 parts |
| allyl methacrylate | 0.3 parts |
| 1,3-butylene glycol dimethacrylate | 0.1 part |
| t-butyl hydroperoxide | 0.11 parts. |

The atmosphere was purged with nitrogen by passing a nitrogen flow through this reactor, the inner temperature was raised to 60° C., and at this point, an aqueous solution composed of

| | |
|---|---|
| ferrous sulfate hepta-hydrate | 0.000075 parts |
| disodium ethylenediamine tetraacetate | 0.000225 parts |
| rongalite | 0.2 parts |
| ion exchanged water | 10 parts | was added, to initiate radical polymerization. By polymerization of the acrylate component, the liquid temperature rose to 78° C. This condition was maintained for 1 hour to complete polymerization of the acrylate component, obtaining latex of a complex rubber-like polymer of a polyorganosiloxane (L-1) with n-butyl acrylate rubber.

The average particle size of the complex rubber-like polymer was 120 nm, and the ratio of rubber-like polymers having a particle size of 500 nm or more in 100% by weight of this complex rubber-like polymer (solid) was 0.1%.

Further, the liquid temperature in the reactor lowered to 70° C., then, to this complex rubber latex was added an aqueous solution composed of

| | |
|---|---|
| rongalite | 0.25 parts |
| ion exchanged water | 10 parts, | then, as the first stage, a mixture of

| | |
|---|---|
| acrylonitrile | 2.5 parts |
| styrene | 7.5 parts |
| t-butyl hydroperoxide | 0.05 parts | was dropped over 2 hours, to effect polymerization. After completion of dropping, condition of a temperature of 60° C. was kept for 1 hour, then, an aqueous solution composed of

| | |
|---|---|
| ferrous sulfate hepta-hydrate | 0.001 part |
| disodium ethylenediamine tetraacetate | 0.003 parts |
| rongalite | 0.2 parts |
| Emal NC-35 (manufactured by Kao Corp.) | 0.2 parts |
| ion exchanged water | 10 parts | was added, then, as the second stage, a mixture of

| | |
|---|---|
| acrylonitrile | 10 parts |
| styrene | 30 parts |
| t-butyl hydroperoxide | 0.2 parts | was dropped over 2 hours, to effect polymerization. After completion of dropping, condition of a temperature of 60° C. was kept for 0.5 hours, then,

| | |
|---|---|
| cumene hydroperoxide | 0.05 parts | was added, further, a condition of a temperature of 60° C. was kept for 0.5 hours, then, the mixture was cooled to obtain graft copolymer latex obtained by graft-polymerizing acrylonitrile and styrene to a complex rubber-like polymer composed of a polyorganosiloxane (L-1) and butyl acrylate rubber.

Then, 150 parts of a 1% calcium acetate aqueous solution was heated to 60° C., and into this was gradually dropped 100 parts of the latex of the graft copolymer, to cause coagulation. The precipitate was dehydrated, washed, and dried to obtain a polyorganosiloxane/acrylate complex rubber-based graft copolymer (A-I-1).

Production Example 5

Production of Polyorganosiloxane/Acrylate Complex Rubber-Based Graft Copolymer (A-I-2)

Polymerization was conducted in the same manner as in Production Example 4 except that the mixture in the first step was changed to

| | |
|---|---|
| acrylonitrile | 5 parts |
| styrene | 15 parts |
| t-butyl hydroperoxide | 0.1 part, | and the mixture in the second step was changed to

| | |
|---|---|
| methyl methacrylate | 28.5 parts |
| methyl acrylate | 1.5 parts |
| t-butyl hydroperoxide | 0.15 parts, | to give graft copolymer latex obtained by graft-polymerizing acrylonitrile and styrene in the first stage, and methyl methacrylate and methyl acrylate in the second stage, to a complex rubber-like polymer composed of a polyorganosiloxane (L-1) and butyl acrylate rubber.

Then, coagulation, dehydration, washing and drying were conducted in the same manner as in Production Example 4, to obtain a polyorganosiloxane/acrylate complex rubber-like graft copolymer (A-I-2).

Production Example 6

Production of Polyorganosiloxane/Acrylate Complex Rubber-Based Graft Copolymer (A-I-3)

Into a reactor equipped with a reagent injection vessel, cooling tube, jacket heater and stirring apparatus was charged

| | |
|---|---|
| polyorganosiloxane latex (L-1) produced in production Example 1 (solid content) | 2 parts |
| Emal NC-35 (polyoxyethylene alkylphenyl ether sulfate; manufactured by Kao Corp.) | 0.2 parts |
| ion exchanged water | 148.5 parts, | and they were mixed, then, to this was added a mixture composed of

| | |
|---|---|
| n-butyl acrylate | 48 parts |
| allyl methacrylate | 1.08 parts |
| 1,3-butylene glycol dimethacrylate | 0.36 parts |
| t-butyl hydroperoxide | 0.11 parts. |

The atmosphere was purged with nitrogen by passing a nitrogen flow through this reactor, the inner temperature was raised to 60° C., and at this point, an aqueous solution composed of

| | |
|---|---|
| ferrous sulfate hepta-hydrate | 0.000075 parts |
| disodium ethylenediamine tetraacetate | 0.000225 parts |
| rongalite | 0.2 parts |
| ion exchanged water | 10 parts | was added, to initiate radical polymerization. By polymerization of the acrylate component, the liquid temperature rose to 80° C. This condition was maintained for 1 hour to complete polymerization of the acrylate component, obtaining latex of a complex rubber-like polymer of a polyorganosiloxane (L-1) with n-butyl acrylate rubber.

The average particle size of the complex rubber-like polymer was 145 nm, and the ratio of rubber-like polymers having a particle size of 500 nm or more in 100% by weight of this complex rubber-like polymer (solid) was 0.3%.

Graft polymerization was conducted in the same manner as in Production Example 4 excepting use of the resulted complex rubber, giving graft copolymer latex obtained by graft-polymerizing acrylonitrile and styrene to a complex rubber-like polymer composed of a polyorganosiloxane (L-1) and n-butyl acrylate rubber.

Then, coagulation, dehydration, washing and drying were conducted in the same manner as in Production Example 4, to obtain a polyorganosiloxane/acrylate complex rubber-like graft copolymer (A-I-3).

Production Example 7

Production of Polyorganosiloxane/Acrylate Complex Rubber-Based Graft Copolymer (A-I-4)

Into a reactor equipped with a reagent injection vessel, cooling tube, jacket heater and stirring apparatus was charged

| | |
|---|---|
| polyorganosiloxane latex (L-2) produced in Production Example 2 (solid content) | 30 parts |
| ion exchanged water (including water in (L-2)) | 295 parts, | and the reactor was purged with nitrogen, then, the reaction mixture was heated to 50° C., and to this was added a mixture composed of

| n-butyl acrylate | 37.5 parts |
|---|---|
| allyl methacrylate | 2.5 parts |
| t-butyl hydroperoxide | 0.3 parts, | and the mixture was stirred for 30 minutes. Then, an aqueous solution composed of

| ferrous sulfate hepta-hydrate | 0.0003 parts |
|---|---|
| disodium ethylenediamine tetraacetate | 0.001 part |
| rongalite | 0.17 parts |
| ion exchanged water | 5 parts | was added, to initiate radical polymerization. Thereafter, an inner temperature of 70° C. was maintained for 2 hours, to complete polymerization of the acrylate component, giving a complex rubber-like polymer latex of a polyorganosiloxane (L-2) and n-butyl acrylate.

The average particle size of the complex rubber-like polymer was 190 nm, and the ratio of rubber-like polymers having a particle size of 500 nm or more in 100% by weight of this complex rubber-like polymer (solid) was 3%.

Into this complex rubber latex was dropped a mixture composed of

| acrylonitrile | 9 parts |
|---|---|
| styrene | 21 parts |
| t-butyl hydroperoxide | 0.3 parts | at an inner temperature of 70° C. over 45 minutes, then, a temperature of 70° C. was maintained for 4 hours, to complete graft polymerization to the complex rubber-like polymer.

Then, this graft copolymer latex was added into a 12% calcium chloride aqueous solution of the same amount (liquid temperature: 60° C.) while stirring, then, a temperature of 80° C. was kept for 5 minutes, further, a temperature of 95° C. was kept for 5 minutes, to cause coagulation. The precipitate was separated, washed, and dehydrated, then, dried at 85° C. for 24 hours, to obtain a polyorganosiloxane/acrylate complex rubber-like graft copolymer (A-I-4).

Production Example 8

Production of Polyorganosiloxane-Based Graft Copolymer (a-I-5)

Polymerization was conducted in the same manner as in Production Example 4 except that 50 parts (solid content) of the complex rubber-like polymer used was changed to 50 parts of a polyorganosiloxane (L-1, solid content), to give a graft copolymer (a-I-5) obtained by grafting acrylonitrile and styrene to a polyorganosiloxane.

Production Example 9

Production of Diene-Based Graft Copolymer (a-I-6)

Into a reactor equipped with a reagent injection vessel, cooling tube, jacket heater and stirring apparatus was charged

| polybutadiene latex (average particle size: 120 nm, ratio of particles having particle size of 500 nm or more: 0.2%) (solid content) at room temperature, and | 50 parts |
|---|---|
| ion exchanged water (including water contained in rubber-like polymer latex) | 140 parts |
| glucose | 0.6 parts |
| anhydrous sodium pyrophosphate | 0.01 part |
| ferrous sulfate hepta-hydrate | 0.005 parts |
| sodium hydroxide | 0.1 part | were added, the reactor was purged with nitrogen while the reaction mixture was stirred, then, the reaction mixture was heated to 50° C. Into this was dropped a mixture composed of

| acrylonitrile | 15 parts |
|---|---|
| styrene | 35 parts |
| t-dodecylmercaptan | 0.5 parts |
| cumene hydroperoxide | 0.3 parts | over 180 minutes while controlling so that the inner temperature was not over 65° C. After completion of dropping,

| cumene hydroperoxide | 0.12 parts |
|---|---| was added, further, the mixture was maintained at the same temperature for 1 hour before cooling.

Then, to the resulted latex was added

| antioxidant (Antage W-400, manufactured by Kawaguchi Kagaku Kogyo K.K.) | 1 part, |
|---|---| and the latex was added into a 1.2% sulfuric acid aqueous solution (liquid temperature: 70° C.) of the same amount as this graft copolymer latex to cause coagulation, further, the temperature was raised to 90° C. and kept for 5 minutes, then, the product was dehydrated, washed and dried to obtain a diene-based graft copolymer (a-I-6) in the form of opalescent powder.

Production Example 10

Production of Acrylate-Based Graft Copolymer (a-I-7)

Polymerization was conducted in the same manner as in Production Example 4 excepting that a polyorganosiloxane (L-1) was not used and the amount of n-butyl acrylate changed to 50 parts, giving a graft copolymer (a-I-7) obtained by grafting acrylonitrile and styrene to n-butyl acrylate rubber.

The average particle size of the rubber-like polymer was 110 nm, and the ratio of particles having a particle size of 500 nm or more was about 0%.

Production Example 11

Production of Acrylate-Based Graft Copolymer (a-I-8)

To 10 parts of polybutadiene latex having a solid content of 35% (pH 10, gel content: 85%, average particle size: 80 nm, solid content) was added 0.2 parts (solid content) of an acid group-containing copolymer latex having a solid content of 33% and an average particle size of 80 nm composed of 81.5% of a n-butyl acrylate unit and 18.5% of a methacrylic acid unit, and the mixture was stirred for 30 minutes, obtaining a thickened diene-based rubber-like polymer latex having an average particle size of 380 nm. To this was charged

| | |
|---|---|
| dipotassium alkenylsuccinate (Latemul ASK manufactured by Kao Corp., as substantial amount, the same in the followings) | 0.3 parts |
| ion exchanged water (including water in thickened butadiene-based polymer latex) | 175 parts, | and to this was added a mixture composed of

| | |
|---|---|
| n-butyl acrylate | 40 parts, |
| allyl methacrylate | 0.16 parts, |
| 1,3-butylene glycol dimethacrylate | 0.08 parts, |
| t-butyl hydroperoxide | 0.1 part | while stirring.

The atmosphere was purged with nitrogen by passing a nitrogen flow through this reactor, the inner temperature was raised to 60° C. When the inner liquid temperature reached 50° C., an aqueous solution composed of

| | |
|---|---|
| ferrous sulfate hepta-hydrate | 0.00015 parts |
| disodium ethylenediamine tetraacetate | 0.00045 parts |
| rongalite | 0.24 parts |
| ion exchanged water | 5.0 parts | was added, then, the inner temperature was raised to 75° C., to initiate radical polymerization. This condition was maintained for 1 hour to complete polymerization of the acrylate component, giving latex of a complex rubber-based rubber-like polymer of a thickened butadiene-based polymer with n-butyl acrylate rubber. The average particle size of this complex rubber-based rubber-like polymer latex was 300 nm, and the ratio of particles having a particle size of 500 nm or more was 51%.

Then, an aqueous solution composed of

| | |
|---|---|
| rongalite | 0.15 parts |
| dipotassium alkenylsuccinate | 0.65 parts |
| ion exchanged water | 10 parts | was added, then, mixed liquid of

| | |
|---|---|
| acrylonitrile | 6.3 parts |
| styrene | 18.7 parts |
| t-butyl hydroperoxide | 0.11 parts | was dropped over 1 hour, to cause polymerization. 5 minutes after completion of dropping, an aqueous solution dissolving

| | |
|---|---|
| ferrous sulfate hepta-hydrate | 0.001 part |
| disodium ethylenediamine tetraacetate | 0.003 parts |
| rongalite | 0.15 parts |
| ion exchanged water | 5 parts | was added, then, mixed liquid of

| | |
|---|---|
| acrylonitrile | 6.3 parts |
| styrene | 18.7 parts |
| t-butyl hydroperoxide | 0.19 parts |
| n-octylmercaptan | 0.014 parts | was dropped over 1 hour, to cause polymerization. After completion of dropping, a condition of a temperature of 75° C. was kept for 10 minutes, then, the mixture was cooled, and when the inner temperature was reached 60° C., a dispersion composed of

| | |
|---|---|
| antioxidant (Antage W-500, manufactured by Kawaguchi Kagaku Kogyo K. K.) | 0.2 parts |
| dipotassium alkenylsuccinate | 0.2 parts |
| ion exchanged water | 5 parts | was added. The above-mentioned operation gave latex of a graft copolymer obtained by graft-polymerizing acrylonitrile/styrene to a complex rubber-based rubber-like polymer of a thickened butadiene-based polymer with n-butyl acrylate rubber.

Then, the above-mentioned polymer latex was added, while stirring, into a 0.6% sulfuric acid aqueous solution heated to 45° C. of an amount 1.2 fold of the whole latex, to coagulate a polymer. Then, the liquid temperature was raised to 65° C. and kept for 5 minutes, then, the liquid temperature was raised to 90° C. Then, the precipitate was separated, then, the recovered substance was added into water of 10-fold amount, then, stirred for 10 minutes, to effect washing treatment. This dispersion was dehydrated in a centrifugal dehydrator, further, dried at 80° C. for 16 hours, to obtain a graft copolymer (a-I-8).

The average particle size and particle size distribution of the latexes described in the production examples were all measured by using a sub-micron particle size distribution measuring apparatus CHDF-2000 manufactured by MATEC APPLIED SCIENCES.

Production Example 12

Production of Vinyl-Based (Co)Polymer (B-1)

An acrylic resin (B-1) composed of 99 parts of methyl methacrylate and 1 part of methyl acrylate and showing a reduced viscosity measured at 25° C. from a N,N-dimethylformamide solution of 0.25 dl/g was produced by known suspension polymerization.

Production Example 13

Production of Vinyl-Based (Co)Polymer (B-2)

An acrylonitrile-styrene copolymer (B-2) composed of 29 parts of acrylonitrile and 71 parts of styrene and showing a reduced viscosity measured at 25° C. from a N,N-dimethylformamide solution of 0.60 dl/g was produced by known suspension polymerization.

Production Example 14

Production of Vinyl-Based (Co)Polymer (B-3)

An acrylonitrile-styrene-N-phenylmaleimide ternary copolymer (B-3) composed of 19 parts of acrylonitrile, 53 parts of styrene and 28 parts of N-phenylmaleimide and showing a reduced viscosity measured at 25° C. from a N,N-dimethylformamide solution of 0.65 dl/g was produced by known continuous solution polymerization.

Production Example 15

Production of Vinyl-Based (Co)Polymer (B-4)

An acrylonitrile-αmethylstyrene copolymer (B-4) composed of 25 parts of acrylonitrile and 75 parts of α methylstyrene and showing a reduced viscosity measured at 25° C. from a N,N-dimethylformamide solution of 0.50 dl/g was produced by known continuous solution polymerization.

Examples 1 to 14 and Comparative Examples 1 to 5

The graft copolymers (A-I-1) to (A-I-4), (a-I-5) to (a-I-8) produced in the production examples, vinyl-based (co)polymers (B-1) to (B-4) produced in the production examples, polycarbonate (C-1, manufactured by Mitsubishi Enpla K.K., trade name: Eupiron S2000F), polyester (C-2, manufactured by Mitsubishi Rayon Co., Ltd., trade name: Tafpet N1300) were compounded in formulations shown in Tables 1 and 2 (numerical values in the tables are by weight), further, ethylenebisstearylamide was added in an amount of 0.4 parts based on 100 parts of these resin components, then, they were mixed using a Henschel mixer, and this mixture was fed to a deaerating type extruder (TEX-30 manufactured by Nippon Seikosho K.K.) having a barrel temperature of 230° C. or 260° C., and kneaded to obtain pellets.

Using the resulted pellets, the Izod impact strength, weather resistance, brightness after direct vapor deposition, and hot plate welding property of the resin composition were measured and evaluated. The results are shown in Tables 1 and 2. Evaluations were conducted according to the following conditions.

(1) Izod Impact Strength

It was conducted by a method according to ASTM D256, and a notched Izod test piece having a thickness of ¼" was left at 23° C. for 12 hours or longer, then, the impact strength was measured.

(2) Weather Resistance

A white-colored plate of 100 mm×100 mm×3 mm was treated for 1000 hours by Sunshine-weather-meter (manufactured by Suga Shikenki K.K.) at a black panel temperature of 63° C. and a cycle condition of 60 minutes (raining: 12 minutes). The weather resistance was evaluated by the degree of discoloration (ΔE) measured by a color difference meter in this case.

(3) Brightness after Direct Vapor Deposition

A plate of 100 mm×100 mm×3 mm was molded as a sample using an injection molding machine manufactured by Toshiba Machine Co., Ltd. "IS80FP" under conditions of a cylinder set temperature of 230° C., a mold temperature of 70° C. and an injection speed of 99%. Then, by a vacuum vapor deposition method, an aluminum vapor deposited film having a film thickness of about 50 nm was formed at a degree of vacuum of $1 \times 10^{-6}$ Torr, an electric current value of 400 mA and a film formation speed of 1.5 mm/s. On this aluminum vapor deposited film, a top coat layer of $SiO_2$ was vapor-deposited.

Regarding the molded article thus obtained by direct vapor deposition, the regular reflectance (%) and diffusion reflectance (%) were measured using a reflectometer ("HR-100" manufactured by Murakami Shikisai Gijutsu Kenkyusho), and brightness was evaluated.

(4) Hot Plate Welding Property

A hot plate processed with a fluorine resin was heated at a surface temperature of 300° C., a test sheet (30 mm×100 mm×3 mm) was allowed to contact with this hot plate for 30 seconds, then, the test sheet was lifted vertically, and the stringing length in this operation was measured, and the hot plate welding property was evaluated. When the stringing length is less than 1 mm, the evaluation was ⊚, when 1 mm or more and less than 5 mm, the evaluation was ○, and when 5 mm or more, the evaluation was X.

(5) Falling Weight Impact Resistance

Using "Dupont impact tester" manufactured by Toyo Seiki Seisakusho, a weight of 1 kg was allowed to fall from a height of 1 mm on a sample plate of 100 mm×100 mm×3 mm under a punch diameter of ½ inch and a cradle diameter of 3 inch, and cracked condition of the sample plate was observed. No cracking was evaluated as ○, and cracking was evaluated as X.

TABLE 1

| | | | Example | | | Comparative Example | | | | Example | | | | | | |
|---|---|---|---|---|---|---|---|---|---|---|---|---|---|---|---|---|
| | | | 1 | 2 | 3 | 1 | 2 | 3 | 4 | 4 | 5 | 6 | 7 | 8 | 9 | 10 |
| Resin compo- sition | Graft copolymer (A) | (A-I-1) | 36 | | | | | | | 36 | 36 | 36 | 27 | 24 | 32 | 80 |
| | | (A-I-2) | | 36 | | | | | | | | | | | | |
| | | (A-I-3) | | | 36 | | | | | | | | | | | |
| | | (A-I-4) | | | | | | | | | | | 9 | | | |
| | | (a-I-5) | | | | 36 | | | | | | | | | | |
| | | (a-I-6) | | | | | 36 | | | | | | | | 12 | |
| | | (a-I-7) | | | | | | 36 | | | | | | | | |
| | | (a-I-8) | | | | | | | | | | | | | | 4 |

TABLE 1-continued

|  |  |  | Example | | | Comparative Example | | | | Example | | | | | | |
|---|---|---|---|---|---|---|---|---|---|---|---|---|---|---|---|---|
|  |  |  | 1 | 2 | 3 | 1 | 2 | 3 | 4 | 4 | 5 | 6 | 7 | 8 | 9 | 10 |
|  | Vinyl-based (co)polymer (B) | (B-1) | 29 | 29 | 29 | 29 | 29 | 29 | 100 | 64 |  | 22 | 30 | 26 | 29 | 20 |
|  |  | (B-2) |  |  |  |  |  |  |  |  | 29 |  |  |  |  |  |
|  |  | (B-3) | 35 | 35 | 35 | 35 | 35 | 35 |  |  | 35 |  | 35 | 35 | 35 |  |
|  |  | (B-4) |  |  |  |  |  |  |  |  |  | 42 |  |  |  |  |
|  | Content 1) | (%) | 18 | 18 | 18 | 18 | 18 | 18 | 0 | 18 | 18 | 18 | 20 | 18 | 18 | 40 |
|  | Ratio 2) | (mol %) | 0 | 0 | 0 | 0 | — | — | — | 0 | 0 | 0 | 0.5 | 0 | 0 | 0 |
|  | Average particle size 3) | (nm) | 120 | 120 | 145 | 50 | 120 | 110 | — | 120 | 120 | 120 | — | — | — | 120 |
|  | Ratio 4) | (%) | 0.1 | 0.1 | 0.3 | 0 | 0.2 | 0 | — | 0.1 | 0.1 | 0.1 | 1.0 | 0.1 | 5.8 | 0.1 |
| Material properties | Izod impact strength | [J/m] | 130 | 110 | 110 | 100 | 130 | 110 | 30 | 120 | 160 | 110 | 140 | 130 | 140 | 480 |
|  | Weather resistance | ΔE | 3.0 | 2.1 | 3.0 | 2.6 | 10.6 | 3.3 | 0.5 | 2.2 | 4.1 | 3.8 | 3.0 | 6.3 | 3.4 | 2.6 |
|  | Brightness 5) Regular 6) | (%) | 81.8 | 82.5 | 82.9 | 81.9 | 81.8 | 82.1 | 83.0 | 82.0 | 81.9 | 81.7 | 82.0 | 81.8 | 81.6 | 82.6 |
|  | Diffuse 7) | (%) | 0.9 | 0.7 | 0.7 | 1.6 | 1.5 | 1.6 | 0.6 | 0.8 | 0.9 | 0.9 | 1.3 | 0.9 | 1.3 | 1.1 |
|  | Hot plate welding property |  | ◎ | ◎ | ◎ | X | ○ | X | X | ◎ | ◎ | ○ | ◎ | ○ | ◎ | ○ |

1) Content of rubber-like polymer
2) Ratio of silicon atoms having three or more siloxane bonds in polyorganosiloxane
3) Average particle size of rubber-like polymer
4) Ratio of rubber having particle size of 500 nm or more in whole rubber-like polymer
5) Brightness after direct vapor deposition
6) Regular reflectance
7) Diffuse reflectance

TABLE 2

|  |  |  | Example | | | Comparative Example 5 | Example 14 |
|---|---|---|---|---|---|---|---|
|  |  |  | 11 | 12 | 13 |  |  |
| Resin composition | Graft copolymer (A) | (A-I-1) | 20 | 15 | 15 |  | 20 |
|  |  | (A-I-4) |  | 5 |  |  |  |
|  |  | (a-I-6) |  |  | 5 | 20 |  |
|  | Vinyl-based (co)polymer (B) | (B-2) | 30 | 30 | 30 | 30 | 30 |
|  | Polycarbonate | (C-1) | 50 | 50 | 50 | 50 |  |
|  | Polyester | (C-2) |  |  |  |  | 50 |
|  | Content 1) | (%) | 10 | 11 | 10 | 10 | 10 |
|  | Ratio 2) | (mol %) | 0 | 0.5 | 0 | — | 0 |
|  | Average particle size 3) | (nm) | 120 | — | 120 | 120 | 120 |
|  | Ratio 4) | (%) | 0.1 | 1.0 | 0.1 | 0.2 | 0.1 |
| Material properties | Izod impact strength | [J/m] | 620 | 610 | 610 | 580 | 210 |
|  | Weather resistance | ΔE | 5.0 | 4.8 | 6.3 | 12.7 | 6.5 |
|  | Brightness 5) Regular 6) | (%) | 82.2 | 81.9 | 82.0 | 82.1 | 82.3 |
|  | Diffuse 7) | (%) | 0.9 | 1.2 | 0.9 | 1.6 | 1.1 |
|  | Hot plate welding property |  | ◎ | ◎ | ◎ | ○ | ○ |

1) Content of rubber-like polymer
2) Ratio of silicon atoms having three or more siloxane bonds in polyorganosiloxane
3) Average particle size of rubber-like polymer
4) Ratio of rubber having particle size of 500 nm or more in whole rubber-like polymer
5) Brightness after direct vapor deposition
6) Regular reflectance
7) Diffuse reflectance The direct vapor depositing resin compositions of the present invention in Examples 1 to 14 had high Izod impact strength and excellent weather resistance, and showed excellent brightness revealing low diffusion reflectance after direct vapor deposition. Further, the stringing length in hot plate welding was short, and the hot plate welding property was also excellent.

On the other hand, the resin compositions in Comparative Examples 1 to 5 were inferior in any one or more of the Izod impact resistance, weather resistance, and brightness after direct vapor deposition.

As shown from Examples 1 and 7, there was a tendency that when the ratio of silicon atoms having three or more siloxane bonds in a polyorganosiloxane contained in a graft copolymer (A-I) is higher, the diffusion reflectance after direct vapor deposition increases and brightness deteriorates. Particularly when the ratio of rubber having a particle size of 500 nm or more in 100% by weight of the whole rubber-like polymer is 4% by weight or less as in Examples 1 to 8, 10 to 14, high Izod impact resistance, weather resistance and brightness after direct vapor deposition not known until now can be manifested.

Production Example 16

Production of Graft Copolymer (A-II-1)

Into a reactor equipped with a reagent injection vessel, cooling tube, jacket heater and stirring apparatus was charged

| ion exchanged water | 200 parts |
|---|---|
| sodium carbonate | 0.05 parts |

| | |
|---|---|
| Phosphanol LO-529 (polyoxylethylene alkylphenyl ether phosphate; manufactured by Toho Chemical Industry Co., Ltd.) | 0.3 parts |
| rongalite | 0.3 parts |
| ferrous sulfate hepta-hydrate | 0.000004 parts |
| disodium ethylenediamine tetraacetate | 0.000012 parts, | and the atmosphere was purged with nitrogen by passing a nitrogen flow through this reactor while the reaction mixture was stirred, the inner temperature was raised to 70° C., and mixed liquid composed of

| | |
|---|---|
| styrene | 12 parts |
| n-butyl acrylate | 50 parts |
| allyl methacrylate | 0.6 parts |
| t-butyl hydroperoxide | 0.19 parts |
| Phosphanol LO-529 | 0.8 parts | was dropped over 3 hours, and after completion of dropping, the mixture was further kept for 2 hours to obtain a rubber-like polymer. After that, an aqueous solution composed of

| | |
|---|---|
| rongalite | 0.75 parts |
| ion exchanged water | 5 parts | was added, then, mixed liquid composed of

| | |
|---|---|
| methyl methacrylate | 36 parts |
| methyl acrylate | 2 parts |
| t-butyl hydroperoxide | 0.06 parts |
| n-octylmercaptan | 0.15 parts |
| Phosphanol LO-529 | 0.3 parts | was dropped over 1.5 hours. Thereafter, the mixture was kept for 30 minutes, to obtain graft copolymer latex.

Then, 150 parts of a 1% calcium acetate aqueous solution was heated to 50° C., and into this was dropped 100 parts of the latex of the graft copolymer gradually to cause coagulation. This slurry was further heated to 95° C. and kept for 5 minutes, then, the precipitate was dehydrated, washed and dried, to obtain a graft copolymer (A-II-1) in the form of white powder.

Production Example 17

Production of Graft Copolymer (A-II-2)

| | |
|---|---|
| Polyorganosiloxane latex (L-1) produced in production Example 1 (solid content) | 8 parts |
| Emal NC-35 (polyoxyethylene alkylphenyl ether sulfate; manufactured by Kao Corp.) | 0.2 parts |
| ion exchanged water | 148.5 parts, | were added into a reactor equipped with a reagent injection vessel, cooling tube, jacket heater and stirring apparatus, and mixed, then, to this was added a mixture composed of

| | |
|---|---|
| n-butyl acrylate | 42 parts |
| allyl methacrylate | 0.3 parts |
| 1,3-butylene glycol dimethacrylate | 0.1 part |
| t-butyl hydroperoxide | 0.11 parts. |

The atmosphere was purged with nitrogen by passing a nitrogen flow through this reactor, the inner temperature was raised to 60° C., and at this point, an aqueous solution composed of

| | |
|---|---|
| ferrous sulfate hepta-hydrate | 0.000075 parts |
| disodium ethylenediamine tetraacetate | 0.000225 parts |
| rongalite | 0.2 parts |
| ion exchanged water | 10 parts | was added, to initiate radical polymerization. By polymerization of the acrylate component, the liquid temperature rose to 78° C. This condition was maintained for 1 hour to complete polymerization of the acrylate component, obtaining latex of a complex rubber-like polymer of a polyorganosiloxane with n-butyl acrylate rubber.

Further, the liquid temperature in the reactor lowered to 70° C., then, to this was added an aqueous solution composed of

| | |
|---|---|
| rongalite | 0.25 parts |
| ion exchanged water | 10 parts, | then, as the first stage, a mixture of

| | |
|---|---|
| methyl methacrylate | 9.5 parts |
| methyl acrylate | 0.5 parts |
| t-butyl hydroperoxide | 0.05 parts | was dropped over 2 hours, to effect polymerization. After completion of dropping, condition of a temperature of 60° C. was kept for 1 hour, then, an aqueous solution composed of

| | |
|---|---|
| ferrous sulfate hepta-hydrate | 0.001 part |
| disodium ethylenediamine tetraacetate | 0.003 parts |
| rongalite | 0.2 parts |
| Emal NC-35 (manufactured by Kao Corp.) | 0.2 parts |
| ion exchanged water | 10 parts | was added, then, as the second stage, a mixture of

| | |
|---|---|
| methyl methacrylate | 38 parts |
| methyl acrylate | 2 parts |
| t-butyl hydroperoxide | 0.2 parts | was dropped over 2 hours, to effect polymerization. After completion of dropping, condition of a temperature of 60° C. was kept for 0.5 hours, then,

| | |
|---|---|
| cumene hydroperoxide | 0.05 parts | was added, further, a condition of a temperature of 60° C. was kept for 0.5 hours, then, the mixture was cooled to obtain graft copolymer latex obtained by graft-polymerizing methyl methacrylate and methyl acrylate to a complex rubber-like polymer composed of a polyorganosiloxane and butyl acrylate rubber.

Then, 150 parts of a 1% calcium acetate aqueous solution was heated to 60° C., and into this was gradually dropped 100 parts of the latex of the graft copolymer, to cause coagulation. The precipitate was dehydrated, washed, and dried to obtain a graft copolymer (A-II-2).

Production Example 18

Production of Graft Copolymer (A-II-3)

Into a reactor equipped with a reagent injection vessel, cooling tube, jacket heater and stirring apparatus was charged

| | |
|---|---|
| ferric sulfate hepta-hydrate | 0.00004 parts |
| disodium ethylenediamine tetraacetate | 0.00012 parts |
| rongalite | 0.2 parts |
| ion exchanged water | 190 parts | and the mixture was heated to 80° C. while stirring under a nitrogen flow. To this was added 1/10 of a mixture composed of

| | |
|---|---|
| methyl methacrylate | 12.1 parts |
| methyl acrylate | 10.9 parts |
| styrene | 1.1 parts |
| ethylene glycol dimethacrylate | 0.8 parts |
| allyl methacrylate | 0.1 part |
| t-butyl hydroperoxide | 0.1 part |
| Phosphanol LO-529 | 0.8 parts | and kept for 15 minutes, then, remaining 9/10 of the mixture was dropped over 3 hours to cause polymerization, then, the reaction mixture was kept for 1 hour at 80° C. without change, to effect polymerization of the innermost layer (core part).

Then, to this core part latex was added an aqueous solution composed of 0.2 parts of rongalite and 5 parts of ion exchanged water, further, a mixture composed of

| | |
|---|---|
| n-butyl acrylate | 30.6 parts |
| styrene | 6.3 parts |
| ethylene glycol dimethacrylate | 0.1 part |
| diallyl malate | 0.5 parts |
| t-butyl hydroperoxide | 0.12 parts |
| Phosphanol LO-529 | 0.7 parts | was dropped over 3 hours to cause polymerization, then, the reaction mixture was further kept for 2 hours at 80° C. without change, to effect polymerization of the intermediate layer (rubber part).

Then, in the presence of this latex, an aqueous solution composed of 0.12 parts of rongalite and 5 parts of ion exchanged water was added, then, a mixture composed of

| | |
|---|---|
| methyl methacrylate | 35.5 parts |
| methyl acrylate | 2.0 parts |
| t-dodecylmercaptan | 0.2 parts |
| t-butyl hydroperoxide | 0.1 part | was dropped over 2 hours to cause polymerization, then, the reaction mixture was further kept for 1 hour at 80° C. without change, to effect polymerization of the outermost layer (graft part), obtaining latex of a graft copolymer (A-II-3) having a three-layer structure.

This latex was coagulated and recovered in the same manner as for the graft copolymer (A-II-1) in Production Example 16, to obtain a graft copolymer (A-II-3) which is a white powder.

Production Example 19

Production of Graft Copolymer (A-II-4)

Into a reactor equipped with a reagent injection vessel, cooling tube, jacket heater and stirring apparatus was added

| | |
|---|---|
| polyorganosiloxane latex (L-3) (solid content) | 8 parts |
| Emal NC-35 (polyoxyethylene alkylphenyl ether sulfate; manufactured by Kao Corp.) | 0.2 parts |
| ion exchanged water | 148.5 parts, | and these were mixed, then, a mixture composed of

| | |
|---|---|
| n-butyl acrylate | 42 parts |
| allyl methacrylate | 0.3 parts |
| 1,3-butylene glycol dimethacrylate | 0.1 part |
| t-butyl hydroperoxide | 0.11 parts | was added.

The atmosphere was purged with nitrogen by passing a nitrogen flow through this reactor, the inner temperature was raised to 60° C., and at this point, an aqueous solution composed of

| | |
|---|---|
| ferrous sulfate hepta-hydrate | 0.000075 parts |
| disodium ethylenediamine tetraacetate | 0.000225 parts |
| rongalite | 0.2 parts |
| ion exchanged water | 10 parts | was added, to initiate radical polymerization. By polymerization of the acrylate component, the liquid temperature rose to 78° C. This condition was maintained for 1 hour to complete polymerization of the acrylate component, obtaining latex of a complex rubber-like polymer of a polyorganosiloxane with n-butyl acrylate rubber.

Further, the liquid temperature in the reactor lowered to 70° C., then, to this was added an aqueous solution composed of

| | |
|---|---|
| rongalite | 0.25 parts |
| ion exchanged water | 10 parts, | then, as the first stage, a mixture of

| | |
|---|---|
| methyl methacrylate | 9.5 parts |
| methyl acrylate | 0.5 parts |
| t-butyl hydroperoxide | 0.05 parts | was dropped over 2 hours, to effect polymerization. After completion of dropping, condition of a temperature of 60° C. was kept for 1 hour, then, an aqueous solution composed of

| | |
|---|---|
| ferrous sulfate hepta-hydrate | 0.001 part |
| disodium ethylenediamine tetraacetate | 0.003 parts |
| rongalite | 0.2 parts |
| Emal NC-35 (manufactured by Kao Corp.) | 0.2 parts |
| ion exchanged water | 10 parts | was added, then, as the second stage, a mixture of

| | |
|---|---|
| methyl methacrylate | 38 parts |
| methyl acrylate | 2 parts |
| t-butyl hydroperoxide | 0.2 parts | was dropped over 2 hours, to effect polymerization. After completion of dropping, condition of a temperature of 60° C. was kept for 0.5 hours, then,

| | |
|---|---|
| cumene hydroperoxide | 0.05 parts | was added, further, a condition of a temperature of 60° C. was kept for 0.5 hours, then, the mixture was cooled to obtain graft copolymer latex obtained by graft-polymerizing methyl methacrylate and methyl acrylate to a complex rubber-like polymer composed of a polyorganosiloxane and butyl acrylate rubber.

Then, 150 parts of a 1% calcium acetate aqueous solution was heated to 60° C., and into this was gradually dropped 100 parts of the latex of the graft copolymer, to cause coagulation. The precipitate was dehydrated, washed, and dried to obtain a graft copolymer (A-II-4).

Production Example 20

Production of Graft Copolymer (a-II-5)

Into a reactor equipped with a reagent injection vessel, cooling tube, jacket heater and stirring apparatus was charged

| | |
|---|---|
| polybutadiene latex (average particle size: 290 nm) (solid content) | 50 parts |
| at room temperature, and to this was added | |
| ion exchanged water (including water contained in rubber-like polymer latex) | 140 parts |
| glucose | 0.6 parts |
| anhydrous sodium pyrophosphate | 0.01 part |
| ferrous sulfate hepta-hydrate | 0.005 parts |
| sodium hydroxide | 0.1 part | and the atmosphere was purged with nitrogen while the reaction mixture was stirred, then the reaction mixture was raised to 50° C., into this was dropped a mixture composed of

| | |
|---|---|
| acrylonitrile | 15 parts |
| styrene | 35 parts |
| t-dodecylmercaptan | 0.5 parts |
| cumene hydroperoxide | 0.3 parts | over 180 minutes, and controlled so that the inner temperature was not over 65° C. After completion of dropping,

| | |
|---|---|
| cumene hydroperoxide | 0.12 parts | was added, further, the reaction mixture was kept for 1 hour before cooling.

Then, to the resulted latex was added

| | |
|---|---|
| antioxidant (Antage W-400, manufactured by Kawaguchi Kagaku Kogyo K.K.) | 1 part, | and the latex was added into a 1.2% sulfuric acid aqueous solution (liquid temperature: 70° C.) of the same amount as this graft copolymer latex to cause coagulation, further, the temperature was raised to 90° C. and kept for 5 minutes, then, the product was dehydrated, washed and dried to obtain a graft copolymer (a-II-5) in the form of opalescent powder.

Production Example 21

Production of Graft Copolymer (a-II-6)

Polymerization was conducted in the same manner as in Production Example 17 excepting that methyl methacrylate and methyl acrylate used in the first stage were changed to 2.5 parts of acrylonitrile and 7.5 parts of styrene, and methyl methacrylate and methyl acrylate used in the second stage were changed to 10 parts of acrylonitrile and 30 parts of styrene, obtaining graft copolymer latex obtained by graft-polymerizing acrylonitrile and styrene to a complex rubber-like polymer composed of a polyorganosiloxane and butyl acrylate rubber.

Then, coagulation, dehydration, washing and drying were conducted in the same manner as in Production Example 17 to obtain a graft copolymer (a-II-6).

Production Example 22

Production of Graft Copolymer (a-II-7)

Into a stainless autoclave equipped with a reagent injection vessel, water cooling jacket heater and stirring apparatus was charged

| | |
|---|---|
| ion exchanged water | 190 parts |
| n-butyl acrylate | 50 parts |
| beef fatty potassium | 1 part |
| sodium N-lauroylsarcosinate | 0.5 parts |
| diisopropylbenzene hydroperoxide | 0.2 parts |
| anhydrous sodium sulfate | 0.2 parts | and the atmosphere was purged with nitrogen while the reaction mixture was stirred. Further,

| 1,3-butadiene | 50 parts |
|---|---| was charged, and the inner temperature was raised to 40° C. Then, a mixture composed of

| ion exchanged water | 10 parts |
|---|---|
| dextrose | 0.2 parts |
| rongalite | 0.05 parts |
| anhydrous sodium pyrophosphate | 0.2 parts |
| disodium ethylenediamine tetraacetate | 0.001 part |
| ferrous sulfate hepta-hydrate | 0.003 parts | was added, to cause polymerization. The inner temperature was raised to 50° C. by polymerization heat generation and temperature rising, and the jacket was controlled so that the temperature was constant at this temperature, finally, polymerization was completed in 9 hours, obtaining a rubber-like polymer having an average particle size of 105 nm.

Then, into a reactor equipped with a cooling tube, jacket heater and stirring apparatus was charged the following components under nitrogen flow, and the mixture was heated to an inner temperature of 65° C. while stirring.

| potassium oleate | 2.2 parts |
|---|---|
| sodium dioctylsulfosuccinate (70% solution) | 3.6 parts |
| sodium formaldehyde sulfoxylate di-hydrate | 0.3 parts |
| ferrous sulfate hepta-hydrate | 0.003 parts |
| disodium ethylenediamine tetraacetate | 0.009 parts |
| ion exchanged water | 200 parts. |

To this was added a mixture composed of

| n-butyl acrylate | 81.5 parts |
|---|---|
| methacrylic acid | 18.5 parts |
| cumene hydroperoxide | 0.5 parts | over 2 hours, and also after completion of addition, polymerization was continued at the same temperature for 2 hours, to obtain an acid group-containing copolymer latex for thickening having an average particle size of 150 nm.

70 parts (solid content) of the resulted rubber-like polymer latex was charged into a reactor equipped with a cooling tube, jacket heater and stirring apparatus, the content was stirred at room temperature, and pH was controlled to 9.2 with a 2% sodium carbonate aqueous solution. Further, 1.2 parts of the acid group-containing copolymer latex (solid content) was charged, stirring was continued for 30 minutes for thickening treatment, obtaining thickened rubber-like polymer latex having an average particle size of 190 nm.

Further, while continuing stirring,

| ion exchanged water (also including water in rubber-like polymer latex) | 200 parts |
|---|---|
| rongalite | 0.14 parts |
| sodium N-lauroylsarcosinate | 0.35 parts | were added, the inner temperature was raised to 75° C., and a mixture of the following compounds was continuously added over 90 minutes, for polymerization.

| methyl methacrylate | 28.8 parts |
|---|---|
| ethyl acrylate | 1.2 parts |
| n-ocrylmercaptan | 0.05 parts |
| cumene hydroperoxide | 0.12 parts. |

After completion of addition, the inner temperature was kept at this temperature further for 60 minutes, completing polymerization.

To the resulted graft copolymer latex was added 0.4 parts of styrenated phenol, 0.3 parts of dilauryl thiopropionate and 0.4 parts of triphenyl phosphite, then, a 0.25% dilute sulfuric acid aqueous solution heated to 50° C. of an amount 2-fold of the graft latex was added to precipitate a graft copolymer, further, thermally treated at 90° C. for 5 minutes, then, washed with water, and dehydration thereof was repeated several times, and finally dried to obtain a graft copolymer (a-II-7) which is a white powder.

Production Example 23

Production of Graft Copolymer (a-II-8)

Polymerization was conducted in the same manner as in Production Example 16 excepting that 36 parts of methyl methacrylate and 2 parts of methyl acrylate used in graft polymerization was changed to 10 parts of acrylonitrile and 28 parts of styrene, obtaining graft copolymer latex obtained by graft-polymerizing acrylonitrile and styrene to butyl acrylate rubber.

Then, coagulation, dehydration, washing and drying were conducted in the same manner as in Production Example 16 to obtain a graft copolymer (a-II-8).

Examples 15 to 27 and Comparative Examples 6 to 11

The graft copolymers (A-II-1) to (A-II-4), (a-II-5) to (a-II-8), (a-I-8) produced in the production examples, polymers (B-1) to (B-4) produced in the production examples, polycarbonate (C-1, manufactured by Mitsubishi Enpla K.K., trade name: Eupiron S2000F), polyester (C-2, manufactured by Mitsubishi Rayon Co., Ltd., trade name: Tafpet N1300) were compounded in formulations shown in Tables 3 and 4 (numerical values in the tables are by weight), further, ethylenebisstearylamide was added in an amount of 0.4 parts based on 100 parts of these resin components, then, they were mixed using a Henschel mixer, and this mixture was fed to a deaerating type extruder (TEX-30 manufactured by Nippon Seikosho K.K.) having a barrel temperature of 230° C. or 260° C., and kneaded to obtain pellets.

Using the resulted pellets, the Izod impact strength, weather resistance, brightness after direct vapor deposition, and hot plate welding property of the resin composition were measured and evaluated as described above. The results are shown in Tables 3 and 4.

TABLE 3

|  |  |  | Example | | | Comparative Example | | | | Example | | | | | | |
|---|---|---|---|---|---|---|---|---|---|---|---|---|---|---|---|---|
|  |  |  | 15 | 16 | 17 | 6 | 7 | 8 | 9 | 18 | 19 | 20 | 21 | 22 | 23 | 24 |
| Resin composition | Graft copolymer (A) | (A-II-1) | 29 |  |  |  |  |  |  | 29 | 29 | 29 | 23 | 23 | 23 |  |
|  |  | (A-II-2) |  |  |  |  |  |  |  |  |  |  |  |  |  | 36 |
|  |  | (A-II-3) |  | 40 |  |  |  |  |  |  |  |  |  |  |  |  |
|  |  | (A-II-4) |  |  | 36 |  |  |  |  |  |  |  |  |  |  |  |
|  |  | (a-II-5) |  |  |  | 36 |  |  |  |  |  |  | 8 |  |  |  |
|  |  | (a-II-6) |  |  |  |  |  |  |  |  |  |  |  | 8 |  |  |
|  |  | (a-II-7) |  |  |  |  |  | 26 |  |  |  |  |  |  |  |  |
|  |  | (a-II-8) |  |  |  |  | 29 |  |  |  |  |  |  |  |  |  |
|  |  | (a-I-8) |  |  |  |  |  |  |  |  |  |  |  |  | 8 |  |
|  | Vinyl-based (co)polymer (B) | (B-1) |  |  |  |  |  |  | 100 | 36 |  |  |  |  |  |  |
|  |  | (B-2) | 71 | 60 | 64 | 64 | 71 | 74 |  | 35 | 39 | 32 | 69 | 69 | 69 | 64 |
|  |  | (B-3) |  |  |  |  |  |  |  |  | 32 |  |  |  |  |  |
|  |  | (B-4) |  |  |  |  |  |  |  |  |  | 39 |  |  |  |  |
|  | Ratio 8) |  | 0 | 0 | 0 | 100 | 0 | 50 | 0 | 0 | 0 | 0 | 22 | 0 | 9 | 0 |
|  | Ratio 9) |  | 100 | 100 | 100 | 0 | 0 | 100 | — | 100 | 100 | 100 | 70 | 70 | 70 | 100 |
| Material properties | Falling weight impact strength |  | ○ | ○ | ○ | ○ | ○ | ○ | X | ○ | ○ | ○ | ○ | ○ | ○ | ○ |
|  | Weather resistance | ΔE | 3.0 | 3.1 | 2.8 | 12.3 | 3.7 | 5.6 | 0.5 | 2.6 | 3.2 | 3.0 | 3.4 | 3.1 | 3.6 | 2.8 |
|  | Brightness 5) Regular 6) | (%) | 82.6 | 82.6 | 82.8 | 82.3 | 81.4 | 81.9 | 83.0 | 82.1 | 81.9 | 82.1 | 81.5 | 82.3 | 81.7 | 82.8 |
|  | Diffuse 7) | (%) | 1.0 | 1.2 | 1.3 | 1.6 | 1.9 | 1.8 | 0.8 | 0.9 | 1.1 | 1.0 | 1.1 | 1.1 | 1.3 | 1.0 |
|  | Hot plate welding property |  | ◎ | ◎ | ◎ | ○ | ○ | X | X | ◎ | ◎ | ○ | ○ | ◎ | ○ | ◎ |

8) Ratio (%) of diene units contained in 100% by weight of whole rubber-like polymer in resin composition
9) Ratio (%) of (meth)acrylate in 100% by weight of graft copolymer grafted part
5) Brightness after direct vapor deposition
6) Regular reflectance
7) Diffuse reflectance

TABLE 4

|  |  |  | Example | | Comparative Example | | Example |
|---|---|---|---|---|---|---|---|
|  |  |  | 25 | 26 | 10 | 11 | 27 |
| Resin composition | Graft copolymer (A) | (A-II-1) | 20 | 15 |  |  | 20 |
|  |  | (a-II-5) |  | 5 | 25 |  |  |
|  |  | (a-II-7) |  |  |  | 18 |  |
|  | Vinyl-based (co)polymer (B) | (B-2) | 30 | 30 | 25 | 32 | 30 |
|  | Polycarbonate (C) | (C-1) | 50 | 50 | 50 | 50 |  |
|  | Polyester (C) | (C-2) |  |  |  |  | 50 |
|  | Ratio 8) |  | 0 | 21 | 100 | 50 | 0 |
|  | Ratio 9) |  | 100 | 70 | 0 | 100 | 100 |
| Material properties | Falling weight impact strength |  | ○ | ○ | ○ | ○ | ○ |
|  | Weather resistance | ΔE | 3.9 | 4.2 | 13.2 | 8.2 | 4.5 |
|  | Brightness 5) Regular 6) | (%) | 82.3 | 81.9 | 81.6 | 81.9 | 82.0 |
|  | Diffuse 7) | (%) | 1.1 | 1.2 | 1.6 | 1.7 | 1.2 |
|  | Hot plate welding property |  | ◎ | ◎ | ○ | X | ○ |

8) Ratio (%) of diene units contained in 100% by weight of whole rubber-like polymer in resin composition
9) Ratio (%) of (meth)acrylate in 100% by weight of graft copolymer grafted part
5) Brightness after direct vapor deposition
6) Regular reflectance
7) Diffuse reflectance The resin compositions of the present invention in Examples 15 to 27 had excellent weather resistance, and showed excellent brightness revealing low diffusion reflectance after direct vapor deposition. Further, the stringing length in hot plate welding was short, and the hot plate welding property was also excellent.

On the other hand, the resin compositions in Comparative Examples 6 to 11 were inferior in any one or more of the weather resistance, brightness after direct vapor deposition and hot plate welding property.

As shown in Examples 15 to 27, the ratio of methyl methacrylate in the grafted part composition (100% by weight) of a graft copolymer contained in the resin composition is preferably from 70 to 100% by weight.

INDUSTRIAL APPLICABILITY

According to the present invention, a direct vapor depositing resin composition capable of providing a beautiful bright appearance after direct vapor deposition of a metal, further, having high level mechanical strengths such as impact strength and the like, and weather resistance, and also excellent in hot plate welding property with a transparent resin such as PMMA resins, polycarbonate resins and the like, and a molded article obtained by using this resin composition, can be provided.

Particularly, balance of weather resistance, brightness after direct vapor deposition and hot plate welding property is extremely excellent as compared with conventionally known rubber-modified resin compositions, and the direct vapor depositing resin composition of the present invention provides an extremely high utility value as various industrial materials.

What is claimed is:

1. A process for preparing a molded article, having metallized surface and diffuse reflectance of from 0.7% to 1.3%, said process comprising:

molding a direct vapor depositing resin composition which comprises at least one member selected from the group consisting of the following graft copolymers (A-I) and (A-II):

(A-I) a graft copolymer obtained by emulsion-graft-polymerizing only at least one monomer component selected from the group of aromatic alkenyl compounds, alkyl (meth)acrylates and vinyl cyanide compounds, to a complex rubber-like polymer (G) obtained by polymerizing (meth)acrylate monomers in the presence of a polyorganosiloxane in the form of latex;

wherein an average particle size of said complex rubbery polymer (G) is from equal to or more than 120 nm to less than 400 nm;

(A-II) a graft copolymer obtained by graft-polymerizing one or more monomers comprising an alkyl (meth)acrylate as an essential component to a rubbery polymer (R) in which the content of diene units is 30% by weight or less (including 0% by weight) in 100% by weight of the rubbery polymer; and metallizing the surface of resulting molded article by direct vapor deposition.

2. The process according to claim 1, wherein said resin composition further comprises a vinyl-based (co)polymer (B) having as a constituent unit at least one member selected from the group consisting of an aromatic alkenyl unit, a vinyl cyanide unit and an alkyl (meth)acrylate unit.

3. The process according to claim 2, wherein said resin composition comprises of from 5 to 95% by weight of graft copolymer (A-I), and of from 95 to 5% by weight of the vinyl-based (co)polymer (B), based on a total amount of the graft copolymer (A-I) and the vinyl-based (co)polymer (B).

4. The process according to claim 2, wherein said resin composition comprises from 5 to 80% by weight of graft copolymers (A-I) and (A-II), from 75 to 0% by weight of vinyl-based (co)polymer (B), and from 95 to 20% by weight of polycarbonate and/or polyester (C), based on a total amount of the graft copolymers (A-I) and (A-II), vinyl-based (co)polymer (B) and polycarbonate and/or polyester (C).

5. The process according to claim 1, wherein said resin composition comprises the graft copolymer (A-I) and a content of rubbery polymers having a particle size of 500 nm or more which is contained in the graft copolymer (A-I) is less than 4% by weight based on all rubbery polymers including said complex rubbery polymer (G).

6. The process according to claim 1, wherein said resin composition comprises the graft copolymer (A-I) in which a content of said polyorganosiloxane in said complex rubbery polymer (G) is from 1 to 99% by weight, based on a total amount of a polyorganosiloxane and said (meth)acrylate-based polymer.

7. The process according to claim 1, wherein said resin composition comprises the graft copolymer (A-I) wherein said polyorganosiloxane is a polydimethylsiloxane in which a content of silicon atoms having three or more siloxane bonds is 1 mol % or less (including 0 mol %), based on all silicon atoms in said polydimethylsiloxane.

\* \* \* \* \*